(12) United States Patent
Guo

(10) Patent No.: US 12,493,649 B2
(45) Date of Patent: Dec. 9, 2025

(54) METHOD AND APPARATUS FOR TRAINING RETRIEVAL MODEL, RETRIEVAL METHOD AND APPARATUS, DEVICE AND MEDIUM

(71) Applicant: Tencent Technology (Shenzhen) Company Limited, Shenzhen (CN)

(72) Inventor: Hui Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 48 days.

(21) Appl. No.: 18/134,447

(22) Filed: Apr. 13, 2023

(65) Prior Publication Data
US 2023/0252070 A1   Aug. 10, 2023

Related U.S. Application Data

(63) Continuation of application No. PCT/CN2022/107973, filed on Jul. 26, 2022.

(30) Foreign Application Priority Data

Aug. 17, 2021   (CN) .......................... 202110945262.5

(51) Int. Cl.
G06F 16/53        (2019.01)
G06F 16/51        (2019.01)

(52) U.S. Cl.
CPC .............. *G06F 16/53* (2019.01); *G06F 16/51* (2019.01)

(58) Field of Classification Search
CPC ........ G06F 16/53; G06F 16/51; G06F 16/538; G06F 16/583; G06N 3/04; G06N 3/08
See application file for complete search history.

(56) References Cited

U.S. PATENT DOCUMENTS

2017/0330054 A1   11/2017   Fu et al.
2018/0341805 A1*  11/2018   Jain ...................... G06F 16/583

FOREIGN PATENT DOCUMENTS

CN        106909625 A        6/2017
CN        106980641 A        7/2017
(Continued)

OTHER PUBLICATIONS

Q. Zhai and M. Jiang, "Deep Product Quantization for Large-Scale Image Retrieval," 2019 IEEE 4th International Conference on Big Data Analytics (ICBDA), Suzhou, China, 2019, pp. 198-202, doi: 10.1109/ICBDA.2019.8713223. keywords: {Quantization (signal); (Year: 2020).*

(Continued)

*Primary Examiner* — Khanh B Pham
*Assistant Examiner* — Samuel C Sharpless, III
(74) *Attorney, Agent, or Firm* — Morgan, Lewis & Bockius LLP

(57) ABSTRACT

A method for training a retrieval model is performed by a computer device. The retrieval model includes an embedding vector network and a quantization index network. The method includes: obtaining n sample triplets; inputting basic feature vectors of the n sample triplets to the embedding vector network to identify, according to errors of feature vectors output by the embedding vector network, a first sample triplet set used for training the quantization index network; inputting the basic feature vectors of the n sample triplets to the quantization index network to identify, according to errors of quantization indexes output by the quantization index network, a second sample triplet set used for training the embedding vector network; training the quantization index network on the basis of the first sample triplet set; and training the embedding vector network on the basis of the second sample triplet set.

15 Claims, 17 Drawing Sheets

(56) References Cited

FOREIGN PATENT DOCUMENTS

| CN | 109815355 | A | | 5/2019 | | |
|---|---|---|---|---|---|---|
| CN | 106980641 | B | * | 1/2020 | ......... | G06F 16/5838 |
| CN | 111782834 | A | | 10/2020 | | |
| CN | 113127672 | A | | 7/2021 | | |
| CN | 113254687 | A | | 8/2021 | | |
| CN | 114282035 | A | | 4/2022 | | |

OTHER PUBLICATIONS

Tencent Technology, ISR, PCT/CN2022/107973, Oct. 9, 2022, 2 pgs.
Tencent Technology, WO, PCT/CN2022/107973, Oct. 9, 2022, 5 pgs.
Tencent Technology, IPRP, PCT/CN2022/107973, Feb. 13, 2024, 6 pgs.
Mingyong Li et al., "Triplet Deep Hashing with Joint Supervised Loss for Fast Image Retrieval", 2019 IEEE 31st International Conference on Tools with Artificial Intelligence (ICTAI), DOI: 10.1109/ICTAI.2019.00090, Nov. 2019, 17 pgs.
Tencent Technology, Extended European Search Report, EP Patent Application No. 22857527.0, Oct. 22, 2024, 10 pgs.
Bin Liu et al., "Deep Triplet Quantization", Proceedings of the 26th ACM International Conference on Multimedia, DOI: 10.1145/3240508.3240516, Oct. 2018, 9 pgs.
Chang Zhou et al., "Deep Triplet Residual Quantization", Expert Systems with Applications, vol. 184, DOI: 10.1016/j.eswa.2021.115467, Jun. 2021, 9 pgs.

* cited by examiner

METHOD AND APPARATUS FOR TRAINING RETRIEVAL MODEL, RETRIEVAL METHOD AND APPARATUS, DEVICE AND MEDIUM

CROSS-REFERENCE TO RELATED APPLICATIONS

The application is a continuation application of PCT Patent Application No. PCT/CN2022/107973, entitled "METHOD AND APPARATUS FOR TRAINING RETRIEVAL MODEL, RETRIEVAL METHOD AND APPARATUS, DEVICE AND MEDIUM" filed on Jul. 26, 2022, which claims priority to Chinese Patent Application No. 202110945262.5, filed with the China National Intellectual Property Administration on Aug. 17, 2021 and entitled "METHOD AND APPARATUS FOR TRAINING RETRIEVAL MODEL, RETRIEVAL METHOD AND APPARATUS, DEVICE AND MEDIUM", all of which is incorporated herein by reference in its entirety.

FIELD OF THE TECHNOLOGY

This application relates to the field of artificial intelligence, particularly to a method and apparatus for training a retrieval model, a retrieval method and apparatus, a device and a medium.

BACKGROUND OF THE DISCLOSURE

When image retrieval is performed on the basis of a query image, a candidate object with a high confidence is often selected as a retrieval result by recalling a plurality of candidate objects for sorting.

In related technologies, a feature vector of the query image is often obtained by using an embedding vector network. A quantization index is obtained by performing product quantization (PQ) on the feature vector; m feature vectors matching the quantization index are found from a quantization codebook; m candidate objects corresponding to the m feature vectors are recalled; and top candidate objects are selected as final recalled images according to the sorting results of distances between the feature vectors of the m candidate objects and the feature vector of the query image.

In the related technologies, a value of each dimension of the feature vector is divided into a plurality of segments by the PQ, and segments are represented by different numerical codes (a quantization method, for example, if a bit value is a floating point number between 0 and 1, it may be divided into 10 segments, including 0.1, . . . 0.9 and 1.0, and segments are represented by numbers from 1 to 10 respectively). During retrieval, candidate objects that are quantized to the same segment are recalled. However, the PQ method easily causes that similar features are split into two adjacent segments, so that critical samples are easily missed to be recalled or repeatedly recalled (e.g., the critical samples of segment 1 and segment 2 may be similar to segment 1 or segment 2, and recalling any segment alone will result in a missed recall and recalling two segments will increase the number of false recalls).

SUMMARY

This application provides a method and apparatus for training a retrieval model, a retrieval method and apparatus, a device and a medium, which can improve the accuracy of retrieval. The technical solutions are as follows:

According to one aspect of this application, a method for training a retrieval model is performed by a computer device. The retrieval model includes an embedding vector network and a quantization index network. The embedding vector network is used for obtaining a feature vector of a retrieval object. The quantization index network is used for extracting a quantization index of the retrieval object. The method includes:

obtaining n sample triplets used for training the retrieval model; the sample triplets each including a training sample, a positive sample that constitutes a similar sample pair with the training sample, and a negative sample that does not constitute a similar sample pair with the training sample, and n being a positive integer greater than 1;

inputting basic feature vectors of the n sample triplets to the embedding vector network to identify a first sample triplet set according to errors of feature vectors output by the embedding vector network;

inputting the basic feature vectors of the n sample triplets to the quantization index network to identify a second sample triplet set according to errors of quantization indexes output by the quantization index network; and training the quantization index network and the embedding vector network on the basis of the first sample triplet set and the second sample triplet set.

According to another aspect of this application, an object retrieval method is provided. The method is implemented by a computer device, and includes:

obtaining a basic feature vector of a query object;

inputting the basic feature vector to the quantization index network and the embedding vector network;

obtaining a quantization index of the query object by using the quantization index network, and obtaining a feature vector of the query object by using the embedding vector network;

obtaining feature vectors of m candidate objects from indexes in a quantization codebook on the basis of the quantization index; the quantization codebook storing mapping relationships between the quantization index and the feature vectors of the m candidate objects, and m being a positive integer;

calculating fifth distances between the feature vectors of the m candidate objects and the feature vector of the query object respectively to obtain m fifth distances; and screening out, from a sorting result of the m fifth distances from small to large, candidate objects corresponding to top z % fifth distances.

According to one aspect of this application, an apparatus for training a retrieval model is provided. The retrieval model includes an embedding vector network and a quantization index network. The embedding vector network is used for obtaining a feature vector of a retrieval object. The quantization index network is used for extracting a quantization index of the retrieval object. The apparatus includes:

an obtaining module, configured to obtain n sample triplets used for training the retrieval model; the sample triplets each including a training sample, a positive sample that constitutes a similar sample pair with the training sample, and a negative sample that does not constitute a similar sample pair with the training sample, and a screening module, configured to input basic feature vectors of the n sample triplets to the embedding vector network; screen out, according to feature vectors output by the embedding vector network, a first sample triplet set used for training the quantization index network;

the screening module being further configured to: input the basic feature vectors of the n sample triplets to the quantization index network; screen out, according to quantization indexes output by the quantization index network, a second sample triplet set used for training the embedding vector network; and a training module, configured to train the quantization index network on the basis of the first sample triplet set, and train the embedding vector network on the basis of the second sample triplet set.

According to another aspect of this application, an object retrieval apparatus is provided, including:

an obtaining module, configured to obtain a basic feature vector of a query object;

an inputting module, configured to input the basic feature vector to the quantization index network and the embedding vector network;

an obtaining module, configured to: obtain a quantization index of the query object by using the quantization index network, and obtain a feature vector of the query object by using the embedding vector network;

an index module, configured to obtain feature vectors of m candidate objects from indexes in a quantization codebook on the basis of the quantization index; the quantization codebook storing mapping relationships between the quantization index and the feature vectors of the m candidate objects, and a calculation module, configured to calculate fifth distances between the feature vectors of the m candidate objects and the feature vector of the query object respectively to obtain m fifth distances; and a screening module, configured to screen out, from a sorting result of the m fifth distances from small to large, candidate objects corresponding to top z % fifth distances.

According to one aspect of this application, a computer device is provided, including: a processor and a memory, the memory storing a computer program that, when executed by the processor, causes the computer device to implement the above method for training a retrieval model, and/or, the above object retrieval method.

According to another aspect of this application, a non-transitory computer-readable storage medium is provided, storing a computer program that, when executed by a processor of a computer device, causes the computer device to implement the above method for training a retrieval model, and/or, the above object retrieval method.

According to another aspect of this application, a computer program product or a computer program is provided. The computer program product or the computer program includes computer instructions stored in a non-transitory computer-readable storage medium. A processor of a computer device reads the computer instructions from the computer-readable storage medium and executes the computer instructions, causing the computer device to implement the above method for training a retrieval model, and/or, the above object retrieval method.

The beneficial effects of the technical solutions provided by the embodiments of this application at least include:

The embedding vector network and the quantization index network are trained by using the sample triplets, so that the first sample triplet set screened out by using the embedding vector network is used as the sample triplets for training the quantization index network, and the second sample triplet set screened out by using the quantization index network is used as the sample triplets for training the embedding vector network. Different networks have different noise recognition capabilities. The embedding vector network and the quantization index network can remove noise from the sample triplets by means of screening processing. Furthermore, the first sample triplet set is used to train the quantization index network, so that the quantization index network can learn the noise recognition capability of the embedding vector network; and the second sample triplet set is used to train the embedding vector network, so that the embedding vector network can learn the noise recognition capability of the quantization index network, thereby promoting mutual improvement of the noise recognition capabilities of the embedding vector network and the quantization index network. Therefore, the above method for training a retrieval model eliminates the influence of noise sample triplets among the sample triplets, and makes a prediction effect of the quantization index network on the positive and negative samples similar to a prediction effect of the embedding vector network on the positive and negative samples. Two branches predict the noise sample triplets, and the two branches learn high-performance sample triplets from each other, so that denoising learning is achieved, and the two branches have similar prediction effects.

DESCRIPTION OF EMBODIMENTS

First, terms involved in the embodiments of this application are briefly introduced.

Figure 1:
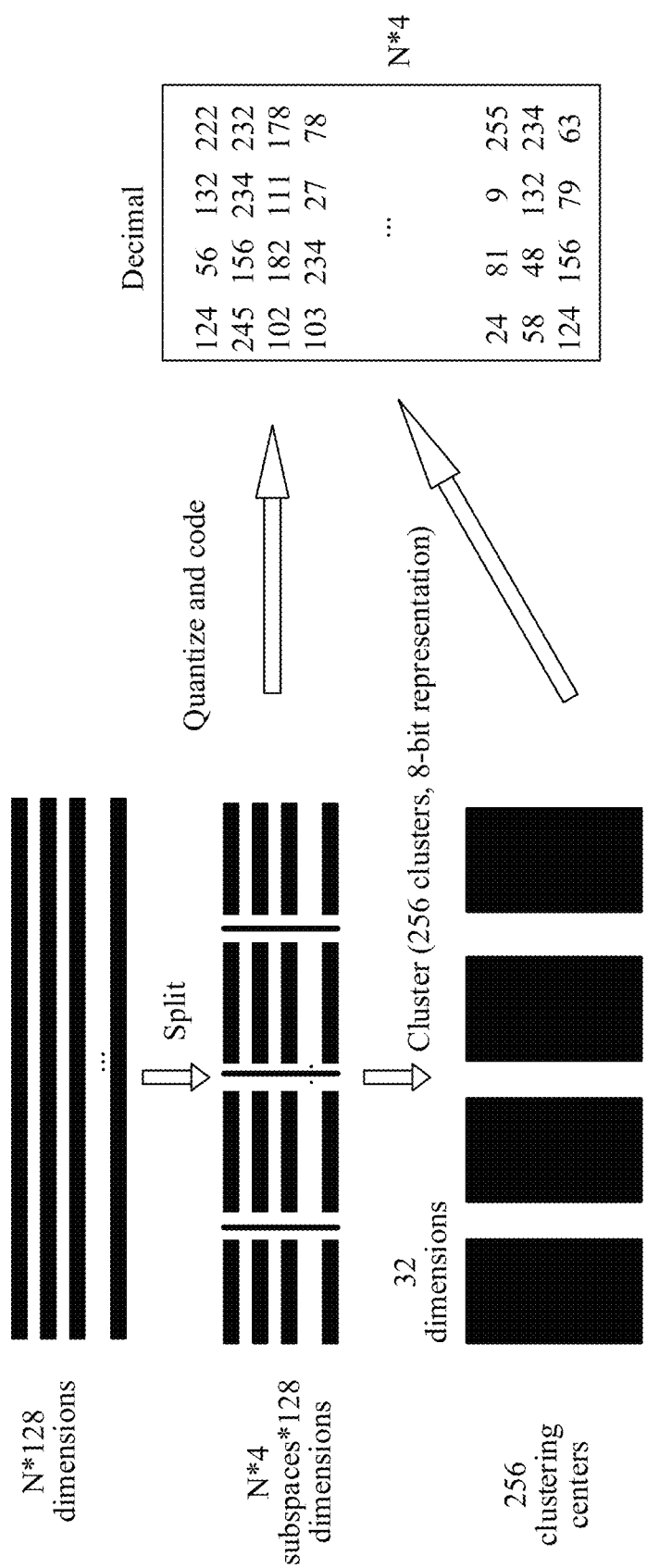
FIG. 1 is a schematic diagram of a product quantization (PQ) according to one exemplary embodiment of this application.

PQ: In a training stage, referring to FIG. 1, for N training samples, assuming that a sample dimension is 128, which is divided into four subspaces, a dimension of each subspace is 32. In each subspace, a feature vector is clustered by k-means (a clustering algorithm) (FIG. 1 shows 256 clustering centers), and a codebook is obtained for each subspace. Furthermore, each sub-segment of each training sample can be approximated by the clustering centers of the subspaces, and corresponding codes are values of the clustering centers. The finally obtained N training samples constitute an index codebook. To-be-quantized samples are divided in the same way, and then the clustering centers closest to the samples are found in the various subspaces one by one, and then the values of the clustering centers are used to represent each sub-segment, that is, index vectors of the to-be-quantized samples are completed.

In a retrieval stage, a feature vector of a query image is divided into four sub-segments. In each subspace, distances from the sub-segments to all the clustering centers in the subspace are calculated, so that 4*256 distances can be obtained, and these calculated distances form a distance table. During the calculation of a distance from a sample to a query vector, such as a distance from a sample with codes (124, 56, 132, 222) to the query vector, the distances corresponding to the various sub-segments are respectively extracted from the distance table. For example, for a sub-segment with a code of 124, the distance No. 124 is extracted from among the 256 distances calculated for the first time. After the distances corresponding to all the sub-segments, the distances of these sub-segments are summed to obtain an asymmetric distance between the sample to the query sample. After all the distances are calculated, the samples with the distances sorted at the front.

In this application, considering that the PQ manner is slow in calculation and easily causes similar basic features to be split into two adjacent clustering centers, a manner of constructing a deep symbol quantization network is adopted.

Deep symbol quantization network (quantization index network): First, for D-dimension feature vectors of N training samples, a value range of each dimension after vector normalization is a floating point number from −1 to 1, and the D-dimension feature vectors are compressed to binary codes with specified digit values of 0 and 1. This is symbolic quantization. For example, (−1, 1, 0.5, −0.2) are obtained after normalization of 4-dimension feature vectors, and quantization indexes (0, 1, 1, 0) are obtained after symbolic quantization.

Computer vision (CV): The CV is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, the CV studies related theories and technologies and attempts to establish an AI system that can obtain information from images or multidimensional data. The CV usually includes image processing, image recognition, image semantic understanding, image retrieval, Optical Character Recognition (OCR), video processing, video semantic understanding, video content/behavior recognition, 3-dimension (3D) object reconstruction, 3D technology, virtual reality, augmented reality, synchronous positioning, map construction and other technologies, as well as common face recognition, fingerprint recognition and other biometric feature recognition technologies.

Artificial intelligence cloud service: The artificial intelligent cloud service is generally also referred to as AI as a Service (AIaaS). This is a current mainstream service manner of an artificial intelligence platform. Specifically, an AIaaS platform will split several types of common artificial intelligence (AI) services and provide independent or packaged services in a cloud. This service mode is similar to opening an AI theme mall: All developers can access and use one or more AI services provided by the platform through an Application Programming Interface (API); and some senior developers can also use an AI framework and AI infrastructure provided by the platform to deploy, operate and maintain own dedicated cloud AI services.

Information (including but not limited to user equipment information, user personal information, and the like), data (including but not limited to data for analysis, stored data, displayed data and the like) and signals involved in this application are all authorized by a user or fully authorized by all parties, and the collection, use and processing of the relevant data need to comply with the relevant laws, regulations and standards of the relevant countries and regions. For example, retrieval objects involved in this application are all obtained under full authorization.

Figure 2:
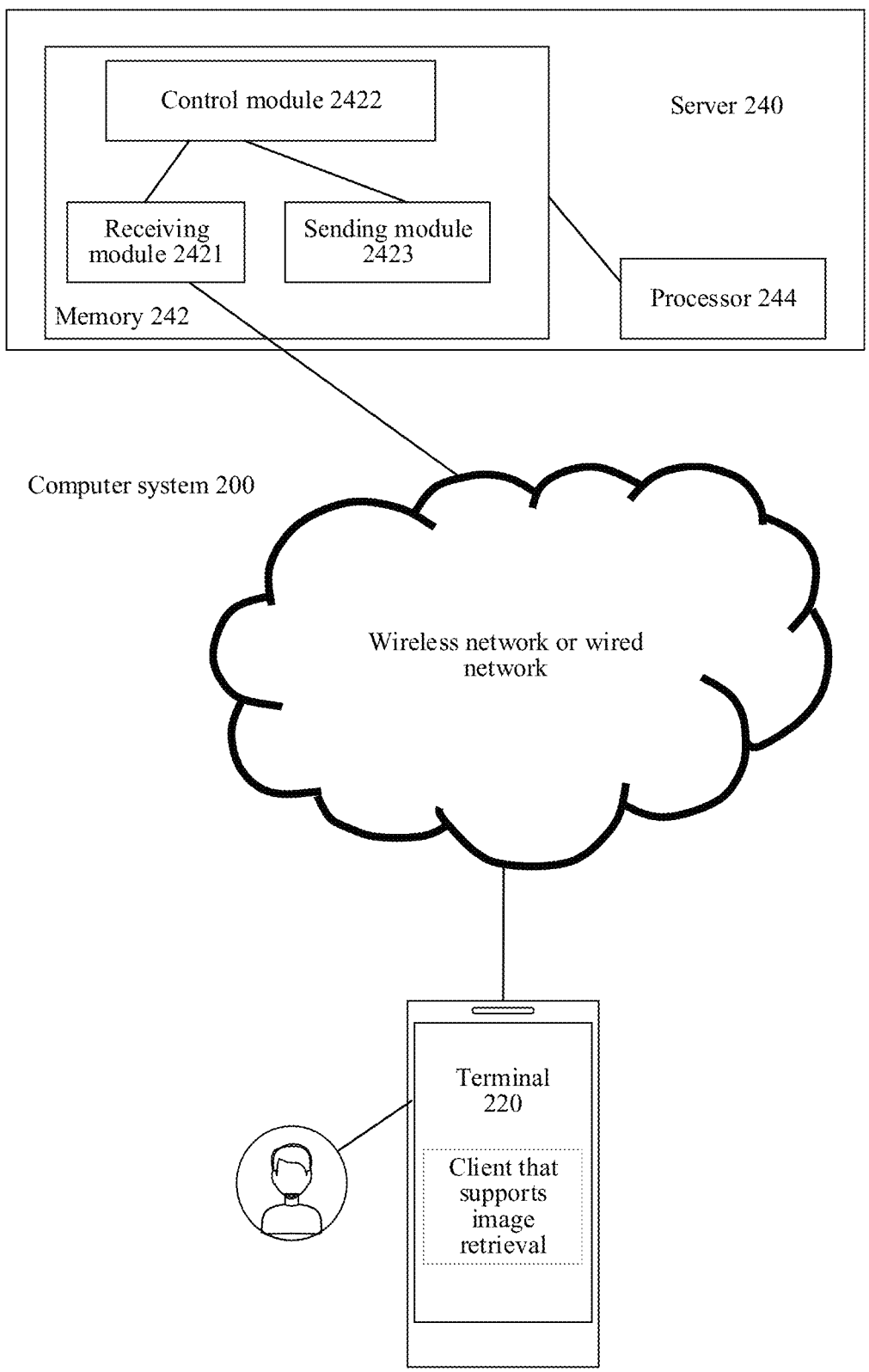
FIG. 2 is a schematic diagram of an implementation environment of a retrieval model according to one exemplary embodiment of this application.

The solutions of the embodiments of this application include a training stage and a retrieval stage of a retrieval model. FIG. 2 shows a method for training and using a retrieval model and a computer system 200 in which the method is used according to one exemplary embodiment of this application. A terminal 220 is configured to train and/or use a retrieval model, and a server 240 is configured to train and/or use the retrieval model.

A client that supports retrieval objects is installed and run on the terminal 220. The client can be any one of an application program, a webpage and a mini program that supports retrieval objects. For example, a retrieved object includes but is not limited to at least one of an image, a video, an audio and a text. The terminal 220 can train and/or use the retrieval model. Optional, the client installed on the terminal 220 is a client on an operating system platform (Android or IOS). The terminal 220 can refer to one of a plurality of terminals in general. The terminal 220 is only taken for example in this embodiment. A device type of the terminal 220 includes: at least one of a smart phone, a smart watch, a smart television, a tablet, an e-book reader, an MP3 player, an MP4 player, a laptop computer and a desktop computer. Persons skilled in the art can learn that a quantity of the terminal can be more or fewer. For example, there may be one terminal or dozens of or hundreds of terminals, or more. This embodiment of this application will not make restrictions on the quantity and device type of the terminal.

The terminal 220 is connected to the server 240 by using a wired network or wireless network.

The server 240 includes at least one of one server, multiple servers, a cloud computing platform, and a virtualization center. For example, the server 240 includes a processor 244 and a memory 242. The memory 242 includes a receiving module 2421, a control module 2422 and a sending module 2423. The receiving module 2421 is configured to receive a request sent by the client, such as training and using the retrieval model. The control module 2422 is configured to control the training and use of the retrieval model. The sending module 2423 is configured to send a response to the terminal, such as returning a retrieved object to the client, or returning a trained retrieval model. The server 240 is configured to provide background services for object retrieval and/or retrieval model training. In some embodiments, the server 240 undertakes main computing work, and the terminal 220 undertakes secondary computing work. Alternatively, the server 240 undertakes secondary computing work, and the terminal 220 and a second terminal 160 undertake primary computing work. Alternatively, the server 240 and the terminal 220 adopt a distributed computing architecture for collaborative computation.

The following describes that the method for training a retrieval model and a retrieval method can be implemented by a computer device. In some embodiments, the computer device can be a terminal or a server. This application does not limit an executive body for the method for training a retrieval model and the retrieval method.

Figure 3:
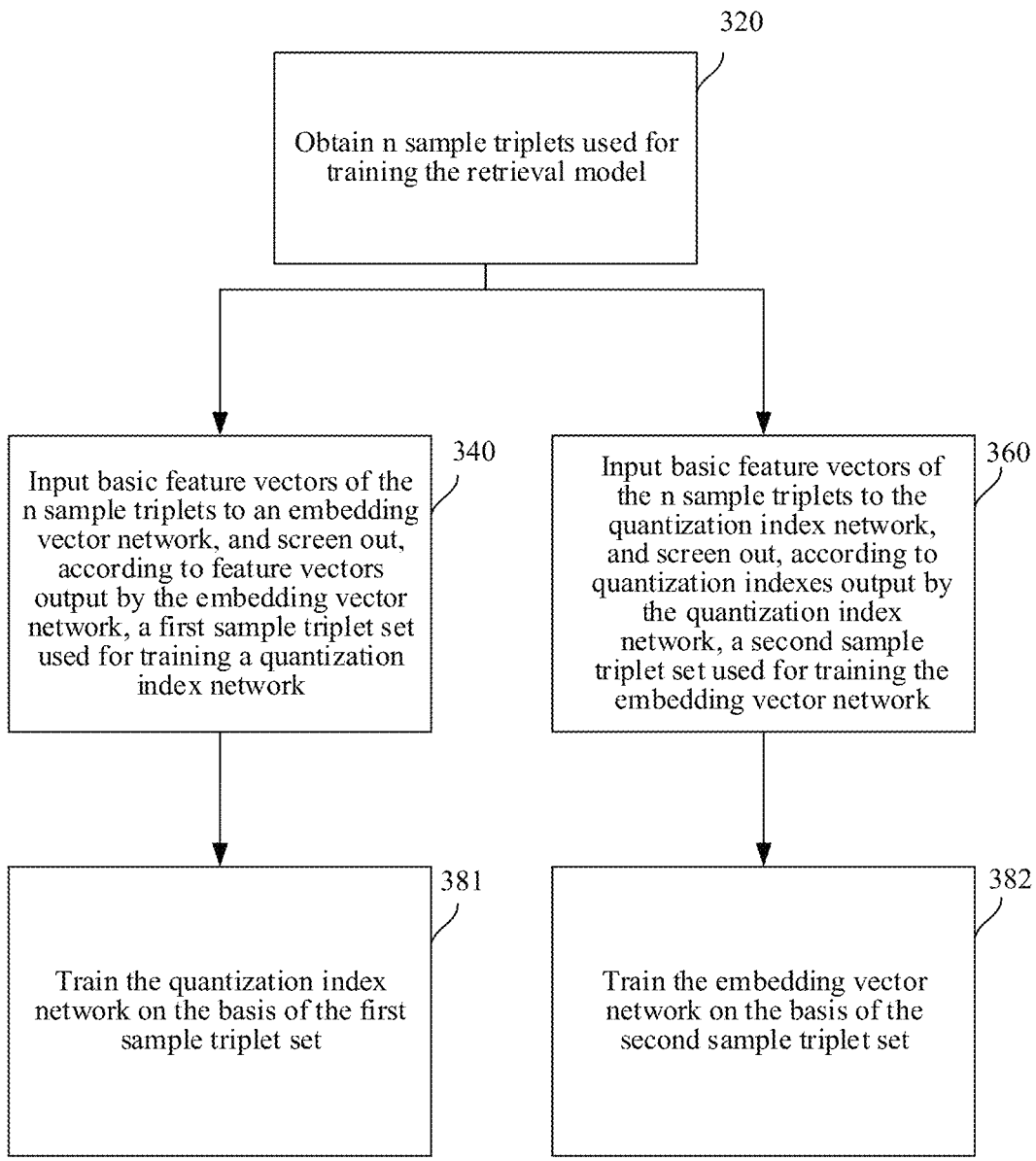
FIG. 3 is a flow chart of a method for training a retrieval model according to one exemplary embodiment of this application.

In order to achieve object retrieval by constructing a deep quantization network, FIG. 3 is a flow chart of a method for training a retrieval model according to one exemplary embodiment of this application. This embodiment is illustrated by taking an example in which the method is performed by the computer device shown in FIG. 2. The retrieval model includes an embedding vector network and a quantization index network. The embedding vector network is used for obtaining a feature vector of a retrieval object, and the quantization index network is used for extracting a quantization index of the retrieval object. The method includes:

Step 320. Obtain n sample triplets used for training the retrieval model.

The sample triplets each includes a training sample, a positive sample that constitutes a similar sample pair with the training sample, and a negative sample that does not constitute a similar sample pair with the training sample, and n being a positive integer greater than 1.

Image retrieval: A quantization index is obtained by using a feature vector of a query image; m feature vectors matching the quantization index are then found from a quantization codebook; distances between the m feature vectors and the feature vector of the query image, and images corresponding to the distances sorted at the top are selected as finally screened-out images; and m is a positive integer.

Audio retrieval: A quantization index is obtained by using a feature vector of a query audio; a feature vectors matching the quantization index are then found from a quantization codebook; distances between the feature vectors and the feature vector of the query audio, and audios corresponding to the distances sorted at the top are selected as finally screened-out audios; and a is a positive integer.

Video retrieval: A quantization index is obtained by using a feature vector of a query video; b feature vectors matching the quantization index are then found from a quantization codebook; distances between the b feature vectors and the feature vector of the query video, and videos corresponding to the distances sorted at the top are selected as finally screened-out videos; and b is a positive integer.

Quantization index: It refers to an index obtained by quantization and used for retrieving the retrieval object. In some embodiments, an image is taken as an example. One quantization index corresponds to one type of images. For example, the image categories of all sample images include: a person character and an animal character, and there is one quantization index corresponding to the person category and another quantization index corresponding to the animal category. For example, the sample images include a dog image and a cat image. A quantization index of the dog image is (1, 0, 1), and a quantization index of the cat image is (1, 1, 1). If a quantization index of a retrieval image is (1, 0, 1), the retrieval image can be determined to the dog image by using the quantization index.

Quantization index network: It refers to a neural network used for extracting a quantization index of a retrieval object.

Embedding feature network: It refers to a neural network used for obtaining a feature vector of a retrieval object. In some embodiments, the embedding feature network codes an input basic feature vector twice to obtain a triplet feature vector. For example, a size of the input basic feature vector is 1×2048, and the embedding feature network codes the input basic feature vector twice to reduce the size of the basic feature vector, thereby obtaining the triplet feature vector. A size of the triplet feature vector is 1×64.

In some embodiments, the retrieval object includes but is not limited to at least one of an image, a video and an audio. In this embodiment, description is made by using an example in which the retrieval object is an image.

In order to better train the quantization index network and make the retrieval model perform well in the distance calculation between the quantization index and the feature vector as much as possible, the sample triplets are often used to train the retrieval model.

Step 340. Input basic feature vectors of the n sample triplets to the embedding vector network, and screen out, according to errors of feature vectors output by the embedding vector network, a first sample triplet set used for training the quantization index network Basic feature vector: It refers to a vector of a basic image feature in a sample triplet. The basic image feature includes but is not limited to a color feature, a texture feature, a shape feature and a spatial relationship feature.

The embedding vector network generates n groups of triplet feature vectors from the basic feature vectors of then sample triplets, and screens out, on the basis of the n groups of triplet feature vectors, a first sample triplet set used for training the quantization index network.

Step 360. Input the basic feature vectors of the n sample triplets to the quantization index network, and screen out, according to errors of quantization indexes output by the quantization index network, a second sample triplet set used for training the embedding vector network.

The quantization index network generates n groups of triplet quantization indexes from the basic feature vectors of the n sample triplets, and screens out a second sample triplet set used for training the embedding vector network.

Step 381. Train the quantization index network on the basis of the first sample triplet set.

Step 382. Train the embedding vector network on the basis of the second sample triplet set.

Train the quantization index network on the basis of the first sample triplet set, and train the embedding vector network on the basis of the second sample triplet set.

In some embodiments, the first sample triplet set is input to the quantization index network to obtain $n_1$ third error losses, and the quantization index network is trained on the basis of the $n_1$ third error losses, where $n_1$ is a positive integer less than n.

In some embodiments, the second sample triplet set is input to the embedding vector network to obtain $n_2$ fourth error losses, and the embedding vector network is trained on the basis of the $n_2$ fourth error losses, where $n_2$ is a positive integer less than n.

In conclusion, the embedding vector network and the quantization index network are trained by using the sample triplets, so that the first sample triplet set screened out by using the embedding vector network is used as the sample triplets for training the quantization index network, and the second sample triplet set screened out by using the quantization index network is used as the sample triplets for training the embedding vector network. The above method for training a retrieval model eliminates the influence of noise sample triplets among the sample triplets, and makes a prediction effect of the quantization index network on the positive and negative samples similar to a prediction effect of the embedding vector network on the positive and negative samples. Two branches predict the noise sample triplets, and the two branches learn high-performance sample triplets from each other, so that denoising learning is achieved, and the two branches have similar prediction effects.

Figure 4:
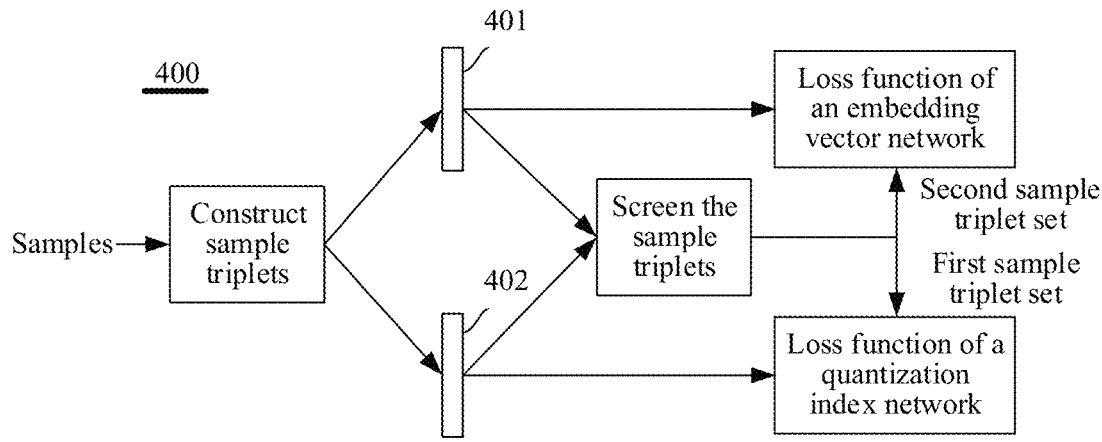
FIG. 4 is a schematic diagram of a system for training a retrieval model according to one exemplary embodiment of this application.

FIG. 4 is a system for training a retrieval model according to one exemplary embodiment of this application. The system for training a retrieval model includes an embedding vector network 401 and a quantization index network 402.

The embedding vector network 401 is used for generating n groups of triplet feature vectors from basic feature vectors of n sample triplets. The triplet feature vectors can be used for calculating similarity distances between training samples, positive samples and negative samples in the sample triplets.

The quantization index network 402 is used for generating n groups of triplet quantization indexes from the basic feature vectors of n sample triplets. The triplet quantization indexes are used for quantizing the sample triplets.

In the system for training a retrieval model shown in FIG. 4, sample triplets are constructed by samples, and the constructed n sample triplets are input to the embedding vector network 401 and the quantization index network 402 respectively. The sample triplets are then screened. A loss function of the quantization index network is calculated by using the first sample triplet set obtained by screening by the embedding vector network 401, and the quantization index network 402 is trained on the basis of the loss function. A loss function of the embedding vector network is calculated by using the second sample triplet set obtained by screening by the quantization index network 402, and the embedding vector network 401 is trained on the basis of the loss function.

The above two branches are used to screen the n sample triplets. The principle is as follows: A noise sample triplet (a sample triplet in which the negative sample and the training sample constitute a positive sample pair) does not necessarily have consistent performance in the embedding vector network 401 and the quantization index network 402. For example: The negative sample and the training sample in the noise sample triplet are considered to constitute a positive sample pair by using the embedding vector network 401, that is, to generate a high loss function. The negative sample and the training sample in the noise sample triplet are considered to constitute a negative sample pair by using the quantization index network 402, that is, to generate a low loss function. At this time, if the noise sample triplet with inconsistent performance is eliminated, the embedding vector network 401 and the quantization index network 402 can be better trained.

For Step 320. Obtain n sample triplets used for training the retrieval model.

In the retrieval model of this application, in order to train the embedding vector network and the quantization index network, it is necessary to introduce the sample triplets. The sample triplets are constructed by using several similar sample pairs.

Similar sample pair: In the retrieval model of this application, in order to train the embedding vector network and the quantization index network, it is necessary to introduce the similar sample pairs. In some embodiments, a similar sample pair includes a target image, and a positive sample that is extremely similar to or the same as the target image. For example, two adjacent frames of images in a video can construct a similar sample pair. In some embodiments, a positive sample that is extremely similar to or the same as the target video. In some embodiments, a similar sample pair includes a target audio, and a positive sample that is extremely similar to or the same as the target audio. For example, adjacent two-second audios can construct a similar sample pair.

Sample triplet: In the retrieval model of this application, in order to generate the n sample triplets, among R similar sample pairs of each batch for training, for the training samples in each similar sample pair, one image is randomly selected from each of the remaining (R-1) similar sample pairs, and distances between feature vectors of the (R-1) images and a feature vector of the training sample; the (R-1) distances are sorted from small to large; and images corresponding to the first n distances and the similar sample pair including the training sample are selected to constitute the n sample triplets. That is, the n sample triplets used for training the retrieval model are obtained.

For example, the method for constructing sample triplets is as follows:

26 similar sample pairs include (A, A'), (B, B'), (C, C'), (D, D'), . . . , (Z, Z'). For the similar sample pair (A, A'), A is a training sample (anchor), A' is a positive sample. One image is randomly selected from each of the remaining similar sample pairs (B, B'), (C, C'), (D, D'), . . . , (Z, Z'), for example, B, C', D, E', . . . , and Z are selected, to separately calculate distances between feature vectors of B, C', D, E', . . . , and Z and a feature vector of the training sample A to obtain 25 distances. The 25 distances are sorted from small to large, and images corresponding to the first 20 distances and the similar sample pair (A, A') where the training sample A is located are selected to constitute 20 sample triplets. That is, the 20 sample triplets used for training the retrieval model are obtained.

In conclusion, the above method achieves the construction of the n sample triplets from the similar sample pairs, so that the obtained n sample triplets can be used for the training the retrieval model provided by this application.

Figure 5:
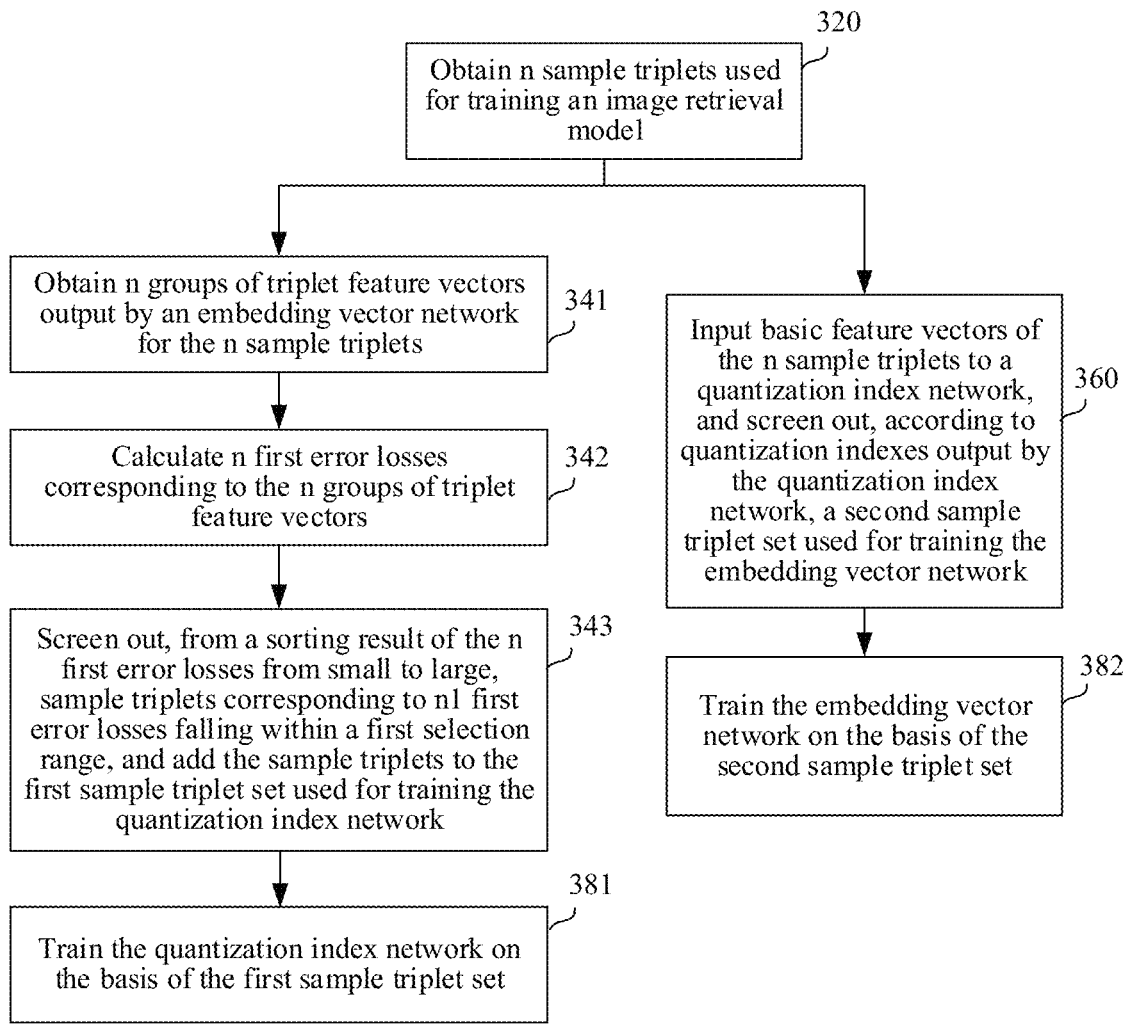
FIG. 5 is a flow chart of a method for training a retrieval model according to another exemplary embodiment of this application.

FIG. 5 shows a flow chart of a method for training a retrieval model according to another exemplary embodiment of this application. Applying the method to the computer device shown in FIG. 2 is taken as an example for illustration. Step 320, Step 360, Step 381 and Step 382 are all consistent with those shown in FIG. 3.

For Step 340. Input basic feature vectors of the n sample triplets to the embedding vector network, and screen out, according to errors of feature vectors output by the embedding vector network, a first sample triplet set used for training the quantization index network.

Step 340 may include the following steps:

Step 341. Obtain n groups of triplet feature vectors output by the embedding vector network for the n sample triplets.

The n sample triplets are input to the embedding vector network 401, and the embedding vector network 401 outputs the n groups of triplet feature vectors.

Step 342. Calculate n first error losses corresponding to the n groups of triplet feature vectors.

The step of calculating n first error losses corresponding to the n groups of triplet feature vectors includes:

calculating, for each group of the triplet feature vectors, a first distance between a feature vector of the training sample and a feature vector of the positive sample; calculating, for each group of the triplet feature vectors, a second distance between the feature vector of the training sample and a feature vector of the negative sample; and calculating a first error loss between a difference value of the first distance and the second distance and a first distance threshold, the first distance threshold being a threshold of a difference value between a distance from the training sample to the positive sample and a distance from the training sample to the negative sample.

Schematically, in each group of triples (a, p, n), the L2 normal form normalization is performed on the triplet feature vectors, and then the first error loss is calculated. a (anchor) represents a training sample, p (positive) represents a positive sample, and n (negative) represents a negative sample.

The first error loss is calculated as follows:

$$l_{tri} = \max(\|X_a - X_p\| - \|X_a - X_n\| + \alpha, 0); \quad (1)$$

where, $l_{tri}$ represents the first error loss; $X_a$ represents a feature vector of the training sample; $X_p$ represents a feature vector of the positive sample; $X_n$ represents a feature vector of the negative sample; α represents the first distance threshold; $\|X_a - X_p\|$ represents a first distance; and $\|X_a - X_n\|$ represents a second distance. In some embodiments, a value of α is 4, which indicates that the distance from the feature vector of the training sample to the feature vector of the negative sample is greater than the distance from the feature vector of the training sample to the feature vector of the positive sample by 4. The purpose of using L2 normalization is to make a feature space of the triplet samples within a range of 0 to 1, and to avoid that a too large feature space is not conductive to optimizing the training of the retrieval model.

Step 343. Screen out, from a sorting result of the n first error losses from small to large, sample triplets corresponding to $n_1$ first error losses falling within a first selection range, and add the sample triplets to the first sample triplet set used for training the quantization index network.

By means of Step 342, the n first error losses can be obtained. The n first error losses are sorted from small to large, and the sample triplets corresponding to the $n_1$ first error losses falling within the first selection range are screened out and are added to the first sample triplet set used for training the quantization index network, where $n_1$ is a positive integer less than n.

In some embodiments, the sample triplets corresponding to the top x % $n_1$ first error losses are screened out according to a preset x value from the sorting result of the n first error losses from small to large, and are added to the first sample triplet set used for training the quantization index network. Schematically, the x value is set on the basis of a ratio of noise sample triplets to the n sample triplets. Optional, the ratio is obtained on the basis of prediction or calibration. Schematically, the x value is slightly greater than the ratio of the noise sample triplets to the n sample triplets, and x is a positive number.

Schematically, the sorting result of the n first error losses constitutes Lem_list, and the $n_1$ sample triplets corresponding to the $n_1$ first error losses sorted in the top 85% are selected from Lem_list as the first sample triplet set.

During the training of the retrieval model, if there are 10% of noise sample triplets in the n sample triplets according to multiple test results (that is, for a similar sample pair in the n sample triplets, images in 10% of other similar sample pairs may constitute positive sample pairs together with the training sample), the $n_1$ sample triplets corresponding to the $n_1$ first error losses sorted in the top 85% are selected from Lem_list as the first sample triplet set. However, in each epoch of training of the retrieval model, especially in the first few epochs of training, it is not always possible to ensure that the noise sample triplets are sorted in the last 10%, so selecting 5% less can avoid selecting the noise sample triplets to a certain extent.

In conclusion, by means of designing the loss function of the embedding vector network, the above method calculates the loss functions of the n groups of triplet feature vectors of the n sample triads, screens, on the basis of the loss functions, the first sample triplet set used for training the quantization index network, and further uses cleaner sample triplets to optimize the quantization effect of the quantization index network.

Figure 6:
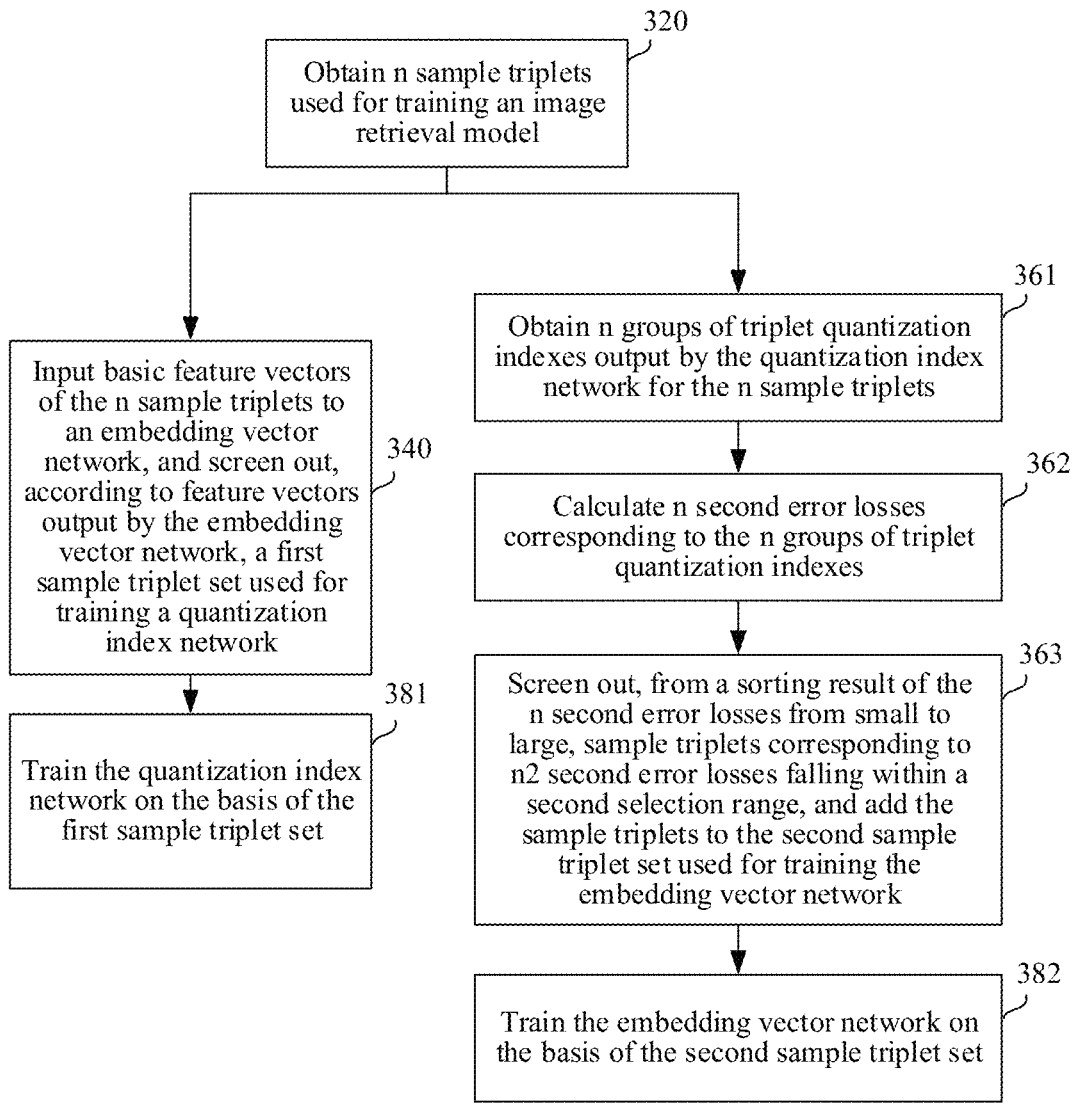
FIG. 6 is a flow chart of a method for training a retrieval model according to another exemplary embodiment of this application.

FIG. 6 shows a flow chart of a method for training a retrieval model according to another exemplary embodiment of this application. Applying the method to the computer device shown in FIG. 2 is taken as an example for illustration. Step 320, Step 340, Step 381 and Step 382 are all consistent with those shown in FIG. 3.

For Step 360. Input the basic feature vectors of the n sample triplets to the quantization index network, and screen out, according to errors of quantization indexes output by the quantization index network, a second sample triplet set used for training the embedding vector network.

Step 360 may include the following steps:

Step 361. Obtain n groups of triplet quantization indexes output by the quantization index network for the n sample triplets, and input the basic feature vectors of the n sample triplets to the quantization index network, to output the n groups of triplet quantization indexes.

Step 362. Calculate n second error losses corresponding to the n groups of triplet quantization indexes.

The step of calculating n second error losses corresponding to the n groups of triplet quantization indexes includes:

calculating, for each group of triplet quantization indexes, a first triplet loss of the triplet quantization indexes; calculating, for each group of triplet quantization indexes, a first quantization error loss of the triplet quantization indexes; and performing weighted summation on the first triplet loss and the first quantization error loss to obtain the second error loss.

Calculate the first triplet loss: Schematically, the triplet quantization indexes are activated by using an activation function, and then the first triplet loss of the quantization indexes is then calculated. In order to ensure that the sample triplets can be distinguished in a quantization space, a distance between the training sample and the negative sample of the sample triplet needs to be large enough. In some embodiments, margin (a in formula (1)) is set to be 160.

A calculation manner of the first triplet loss is similar to that of the first error loss mentioned above, and will not be repeated. The difference here is that a dimension of the triplet quantization index is inconsistent with that of the triplet feature vector.

For the n groups of triplet quantization indexes output by the quantization index network 402, optionally, the triplet quantization index has 256 dimensions. Each dimension is converted to a value of (−1, 1) by using the activation function, and symbolic quantization is then performed to finally obtain the 256-dimension triplet quantization index.

Calculate the first quantization error loss: In order to better train the quantization index network, the value of each dimension of the triplet quantization index to be used is as close as possible to −1 or 1 (if the value of each dimension is at a critical value, that is, close to 0, similar basic feature vectors are easily quantized to different segments). Therefore, a quantization loss function is set as following formulas (2) (3). First, the following is calculated:

$$b_i = \text{sgn}(u_i) = \begin{cases} -1, & \text{if } u_i < 0 \\ 1, & \text{else} \end{cases}; \quad (2)$$

where $u_i$ is a value of each dimension of the triplet quantization index without symbol quantization (a value less than 0 is quantized to be 0, and a value greater than 0 is quantized to be 1); a range of $u_i$ is (−1, 1); and $b_i$ is a value (−1 or 1) of each dimension of the triplet quantization index after conversion.

A regression loss between $b_i$ and $u_i$ is then calculated, $$L_{coding} = \Sigma_{i=1}^{256}(b_i - u_i)^2; \quad (3)$$

Where $L_{coding}$ is the first quantization error loss.

The above activation function can be set to be a Tan h function or sgn function. The sgn function is not derivable at position 0 (+0 and −0), that is, it is impossible to perform gradient calculation (which cannot be used in deep learning based on sgd gradient backhaul). The Tan h activation is derivable and can be mapped to be between −1 and 1. In addition, the activation function can also use sigmoid (which is activated between 0 and 1), and then use 0 and 1 (instead of −1 and 1) as quantization targets. A training effect is better because tan h can obtain (−1, 1) faster.

Calculate the second error loss: Weighted summation is performed on the basis of the obtained first triplet loss and first quantization error loss, to obtain the second error loss.

$$L_q = w_{21} L_{triplet} + w_{22} L_{coding}; \quad (4)$$

where $L_q$ is output as the second error loss; $L_{triplet}$ is the first triplet loss; $L_{coding}$ is the first quantization error loss; and $w_{21}$ and $w_{22}$ are weights. Optional, the first quantization error loss converges faster than the first triplet loss. In order to ensure that the first triplet loss is dominant in the overall second error loss, it is ensured that the embedding vector network always has the ability of measuring a similarity. Therefore, $w_{21}$ is set to be 1, and $w_{22}$ is set to be 0.5.

Values of $w_{21}$ and $w_{22}$ above are not fixed, as long as it is ensured that the value of $w_{22}$ is less than that of $w_{21}$.

Step 363. Screen out, from a sorting result of the n second error losses from small to large, sample triplets corresponding to $n_2$ second error losses falling within a second selection range, and add the sample triplets to the second sample triplet set used for training the embedding vector network.

By means of Step 362, the n second error losses can be obtained. The n second error losses are sorted from small to large, and the sample triplets corresponding to the $n_2$ second error losses falling within the second selection range are screened out and are added to the second sample triplet set used for training the quantization index network.

In some embodiments, the sample triplets corresponding to the top y % $n_2$ second error losses are screened out according to a preset y value from the sorting result of the n second error losses from small to large, and are added to the second sample triplet set used for training the embedding vector network. Schematically, the y value is set on the basis of a ratio of noise sample triplets to then sample triplets. Optional, the ratio is obtained on the basis of prediction or calibration. Schematically, they value is slightly greater than the ratio of the noise sample triplets to the n sample triplets, and y is a positive number.

Schematically, the sorting result of the n second error losses constitutes Lq_list, and the $n_2$ sample triplets corresponding to the $n_2$ second error losses sorted in the top 85% are selected from Lq_list as the second sample triplet set, where $n_2$ is a positive integer less than n.

During the training of the retrieval model, if there are 10% of noise sample triplets in the n sample triplets according to multiple test results (that is, for a similar sample pair in the n sample triplets, images in 10% of other similar sample pairs may constitute positive sample pairs together with the training sample), the $n_2$ sample triplets corresponding to the $n_2$ second error losses sorted in the top 85% are selected from Lq_list as the second sample triplet set. However, in each epoch of training of the retrieval model, especially in the first few epochs of training, it is not always possible to ensure that the noise sample triplets are sorted in the last 10%, so selecting 5% less can avoid selecting the noise sample triplets to a certain extent.

In conclusion, by means of designing the loss function of the quantization index network, the above method calculates the loss functions of the n groups of triplet quantization indexes of the n sample triads, screens, on the basis of the loss functions, the second sample triplet set used for training the embedding vector network, and further uses cleaner sample triplets to optimize the calculation effect of the embedding vector network.

Figure 7:
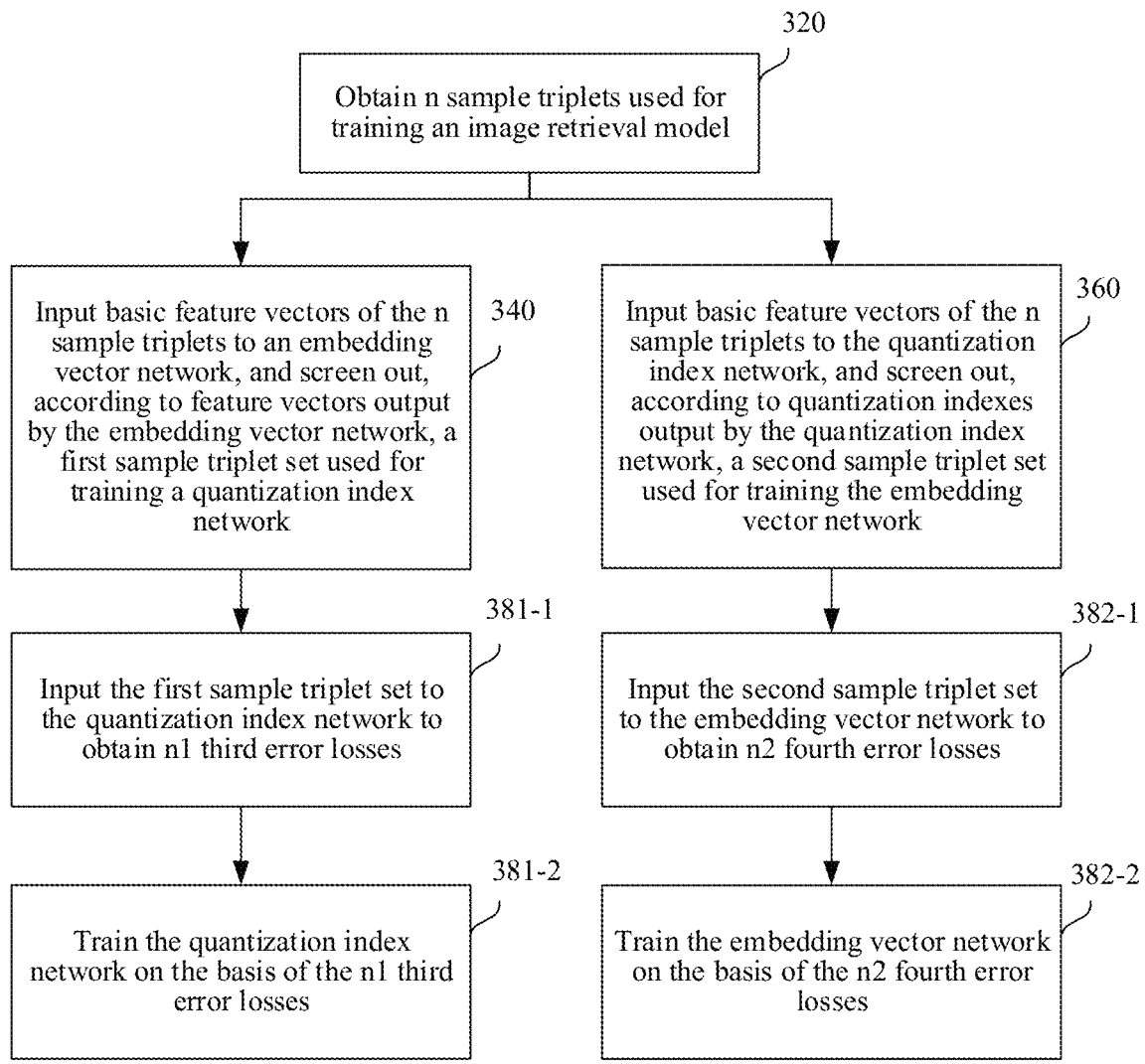
FIG. 7 is a flow chart of a method for training a retrieval model according to another exemplary embodiment of this application.

FIG. 7 shows a flow chart of a method for training a retrieval model according to another exemplary embodiment of this application. Applying the method to the computer device shown in FIG. 2 is taken as an example for illustration. Step 320, Step 340 and Step 360 are all consistent with those shown in FIG. 3.

For Step 381. Train the quantization index network on the basis of the first sample triplet set, which includes:

Step 381-1. Input the first sample triplet set is input to the quantization index network to obtain $n_1$ third error losses.

The first sample triplet set includes $n_1$ sample triplets. First sample triplets are obtained by sorting the first error losses of the n groups of triplet feature vectors output by the embedding vector network 401, specifically refer to the "For Step 340" above.

The step of inputting the first sample triplet set to the quantization index network to obtain $n_1$ third error losses includes:

calculating, for each sample triplet of the first sample triplet set, a second triplet loss of the triplet feature vector by using the quantization index network, the triplet feature vector being a feature vector output by the embedding vector network; calculating, for each sample triplet of the first sample triplet set, a second quantization error loss of the triplet feature vector by using the quantization index network; and performing weighted summation on the second triplet loss and the second quantization error loss to obtain the third error loss.

The method of calculating the $n_1$ third error losses is similar to the manner of calculating the n second error losses in Step 362 above, and will not be repeated.

Step 381-2. Train the quantization index network on the basis of the $n_1$ third error losses.

The computer device trains the quantization index network on the basis of the $n_1$ third error losses.

For Step 382. Train the embedding vector network on the basis of the second sample triplet set, which includes:

Step 382-1. Input the second sample triplet set to the embedding vector network to obtain $n_2$ fourth error losses.

The second sample triplet set includes $n_2$ sample triplets. The second sample triplets are obtained by sorting the second error losses of the n groups of triplet quantization indexes output by the quantization index network 402, specifically refer to the "For Step 360" above.

The step of inputting the second sample triplet set to the embedding vector network to obtain $n_2$ fourth error losses includes:

calculating, for each sample triplet of the second sample triplet set, a third distance between a feature vector of the training sample and a feature vector of the positive sample by using the embedding vector network;

calculating, for each sample triplet of the second sample triplet set, a fourth distance between the feature vector of the training sample and a feature vector of the negative sample by using the embedding vector network; and calculating a fourth error loss between a difference value of the third distance and the fourth distance and a second distance threshold, the second distance threshold being a threshold of a difference value between a distance from the training sample to the positive sample and a distance from the training sample to the negative sample.

The method of calculating the $n_2$ fourth error losses is similar to the manner of calculating the n first error losses in Step 342 above, and will not be repeated.

Step 382-2. Train the embedding vector network on the basis of the $n_2$ fourth error losses.

The computer device trains the embedding vector network on the basis of the $n_2$ fourth error losses.

In conclusion, the quantization index network is quantized using the first sample triplet set, and the embedding vector network is trained using the second sample triplet, so that the quantization effect of the quantization index network and the feature vector calculation effect of the embedding vector network are optimized.

Figure 8:
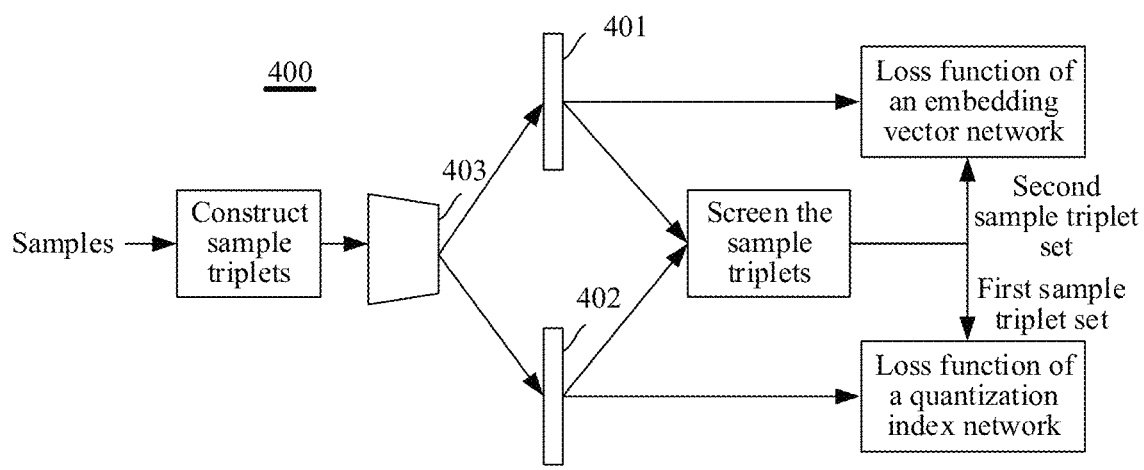
FIG. 8 is a schematic diagram of a system for training a retrieval model according to another exemplary embodiment of this application.

FIG. 8 shows a system for training a retrieval model according to one exemplary embodiment of this application, which additionally includes a basic feature network 403 when compared to the system for training a retrieval model shown in FIG. 4.

The method for training a retrieval model shown in FIG. 3 further includes, between Step 320 and Step 340: obtaining basic feature vectors of the n sample triplets by using the basic feature network.

The basic feature vector 403 is used for extracting a basic image feature of an input sample triplet. The basic feature includes but is not limited to a color feature, a texture feature, a shape feature and a spatial relationship feature.

Figure 9:
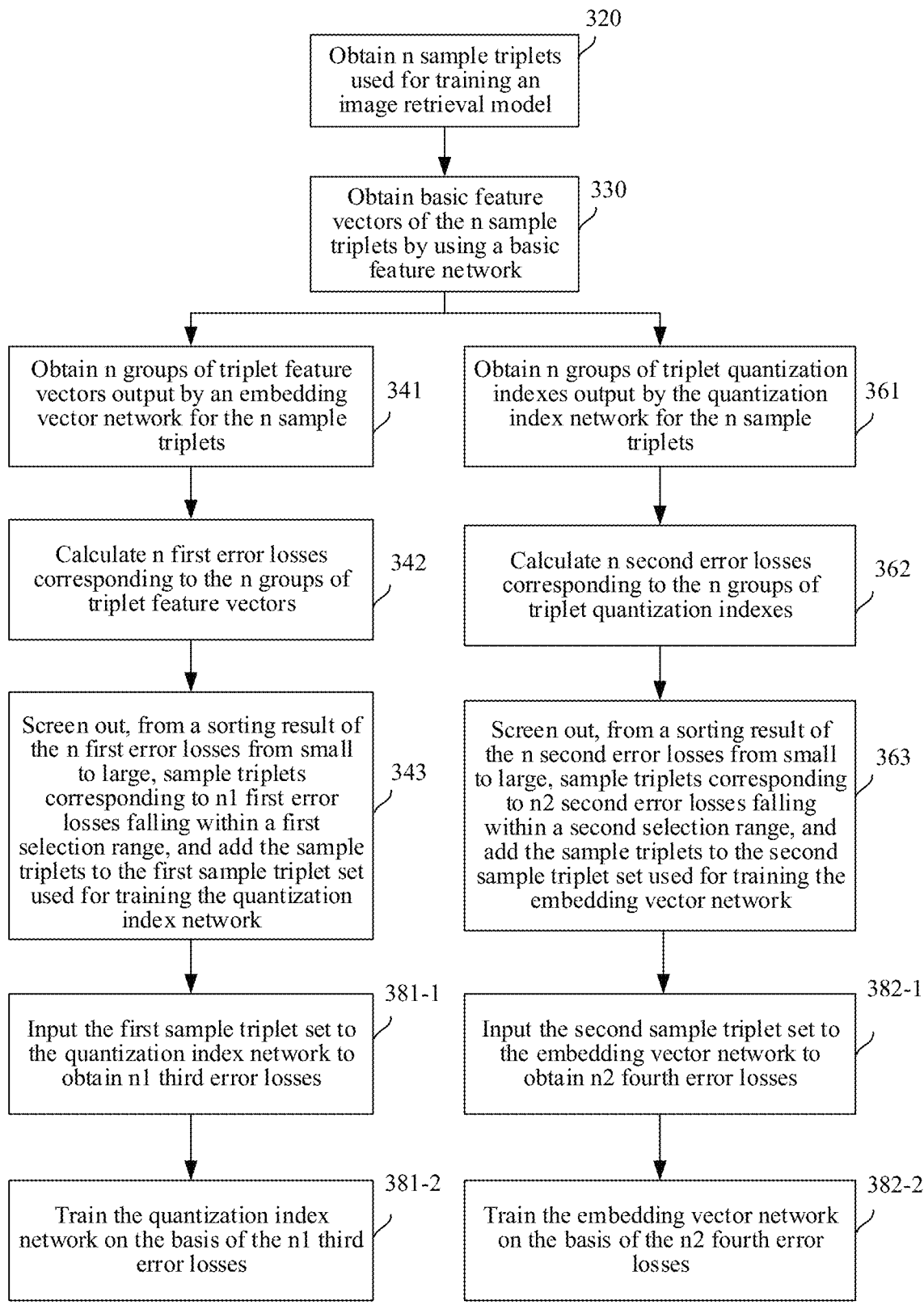
FIG. 9 is a flow chart of a method for training a retrieval model according to another exemplary embodiment of this application.

FIG. 9 shows a schematic diagram of a method for training a retrieval model according to another exemplary embodiment of this application. Applying the method to the computer device shown in FIG. 2 is taken as an example for illustration. The method includes:

Step 320. Obtain n sample triplets used for training the retrieval model.

The computer device obtains the n sample triplets used for training the retrieval model.

Details of Step 320 may refer to "For Step 320" above.

Step 330. Obtain basic feature vectors of the n sample triplets by using the basic feature network.

The computer device obtains the basic feature vectors of the n sample triplets by using the basic feature network.

Step 341. Obtain n groups of triplet feature vectors output by the embedding vector network for the n sample triplets.

The computer device obtains the n groups of triplet feature vectors output by the embedding vector network for the n sample triplets.

Step 342. Calculate n first error losses corresponding to the n groups of triplet feature vectors.

The computer device calculates n first error losses corresponding to the n groups of triplet feature vectors.

Step 343. Screen out, from a sorting result of the n first error losses from small to large, sample triplets corresponding to $n_1$ first error losses falling within a first selection range, and add the sample triplets to the first sample triplet set used for training the quantization index network.

The computer device screens out, from a sorting result of the n first error losses from small to large, sample triplets corresponding to $n_1$ first error losses falling within a first selection range, and adds the sample triplets to the first sample triplet set used for training the quantization index network.

Details of Step 341, Step 342 and Step 343 may refer to the embodiment shown in FIG. 5.

Step 381-1. Input the first sample triplet set is input to the quantization index network to obtain $n_1$ third error losses.

The computer device inputs the first sample triplet set to the quantization index network to obtain the $n_1$ third error losses. The step of inputting the first sample triplet set to the quantization index network to obtain $n_1$ third error losses includes:

The computer device calculates, for each sample triplet of the first sample triplet set, a second triplet loss of the triplet feature vector. The computer device calculates, for each sample triplet of the first sample triplet set, a second quantization error loss of the triplet feature vector. The computer device performs weighted summation on the second triplet loss and the second quantization error loss to obtain the third error loss.

Step 381-2. Train the quantization index network on the basis of the $n_1$ third error losses.

The computer device trains the quantization index network on the basis of the $n_1$ third error losses.

Step 361. Obtain n groups of triplet quantization indexes output by the quantization index network for the n sample triplets.

The computer device inputs the basic feature vectors of the n sample triplets to the quantization index network, to output the n groups of triplet quantization indexes.

Step 362. Calculate n second error losses corresponding to the n groups of triplet quantization indexes.

The computer device calculates n second error losses corresponding to the n groups of triplet quantization indexes in the following way:

The computer device calculates, for each group of triplet quantization indexes, a first triplet loss of the triplet quantization indexes. The computer device calculates, for each group of triplet quantization indexes, a first quantization error loss of the triplet quantization indexes. The computer device performs weighted summation on the first triplet loss and the first quantization error loss to obtain the second error loss.

Step 363. Screen out, from a sorting result of the n second error losses from small to large, sample triplets corresponding to $n_2$ second error losses falling within a second selection range, and add the sample triplets to the second sample triplet set used for training the embedding vector network.

The computer device screens out the sample triplets corresponding to the top y % $n_2$ second error losses according to a preset y value from the sorting result of the n second error losses from small to large, and adds the sample triplets to the second sample triplet set used for training the quantization index network.

Details of Step 361, Step 362 and Step 363 may refer to the embodiment shown in FIG. 6.

Step 382-1. Input the second sample triplet set to the embedding vector network to obtain $n_2$ fourth error losses.

The computer device inputs the second sample triplet set to the embedding vector network to obtain $n_2$ fourth error losses.

Step 382-2. Train the embedding vector network on the basis of the $n_2$ fourth error losses.

The computer device trains the embedding vector network on the basis of the $n_2$ fourth error losses.

Details of Step 381-1, Step 381-2, Step 382-1 and Step 382-2 may refer to the embodiment shown in FIG. 7.

In conclusion, the embedding vector network and the quantization index network are trained by using the sample triplets, so that the first sample triplet set screened out by using the embedding vector network is used as the sample triplets for training the quantization index network, and the second sample triplet set screened out by using the quantization index network is used as the sample triplets for training the embedding vector network. By the above method, the embedding vector network supports calculating distances between feature vectors of m candidate objects and a feature vector of a query image, and a quantization index of the query image obtained by the quantization index network is more accurate. The above method for training a retrieval model eliminates noise sample triplets, and makes a prediction effect of the quantization index network on the positive and negative samples similar to a prediction effect of the embedding vector network on the positive and negative samples. Two branches predict the noise sample triplets, and the two branches learn high-performance sample triplets from each other, so that denoising learning is achieved, and the two branches have similar prediction effects.

Based on the above, the technical solutions of this application have been fully discussed. Next, relevant training parameters of the retrieval model will be introduced below.

For the basic feature network, optional, the basic feature network is a resnet101 network (a convolutional neural network). That is, the basic feature network can be trained using the resnet101 network, and specific parameters are shown in Table 1 below. The Conv1 to Conv5 of the basic feature network uses parameters of ResNet101 pre-trained on an ImageNet data set (a large universal object recognition open-source data set). Optional, the basic feature network can also use a resnet18CNN network.

TABLE 1

| Name of network layer | Size of output | ResNet-101 | |
|---|---|---|---|
| Network layer Conv1 | 300 × 500 | 7 × 7, 64, step length 2 | |
| Network layer Conv2_x | 150 × 250 | 3 × 3 max pool, step length 2 | |
| | | 1 × 1, 64 | ×3 block |
| | | 3 × 3, 64 | |
| | | 1 × 1, 256 | |
| Network layer Conv3_x | 76 × 126 | 1 × 1, 128 | ×4 block |
| | | 3 × 3, 128 | |
| | | 1 × 1, 512 | |
| Network layer Conv4_x | 38 × 63 | 1 × 1, 256 | ×3 block |
| | | 3 × 3, 256 | |
| | | 1 × 1, 1024 | |
| Network layer Conv5_x | 19 × 32 | 1 × 1, 512 | ×3 block |
| | | 3 × 3, 512 | |
| | | 1 × 1, 2048 | |
| Network layer Pool | 1 × 2048 | Max pool | |

The embedding vector network is trained using the parameters in Table 2 below. The embedding vector network can also be referred to as Embedding network. The embedding vector network is initialized using Gaussian distribution with a variance of 0.01 and a mean of 0. In some embodiments, the embedding vector network can also use multi-layer Fc. The embedding vector network outputs a 64-dimension vector.

TABLE 2

| Name of network layer | Size of output | Network layer |
|---|---|---|
| Embedding vector network (Embedding) | 1 × 64 | Full connection |

The quantization index network is trained using the parameters as shown in Table 3 below. The quantization index network is initialized using Gaussian distribution with a variance of 0.01 and a mean of 0.

TABLE 3

| Name of network layer | Size of output | Network layer |
|---|---|---|
| Quantization index network | 1 × 256 | Full connection |

For the retrieval model:

Set learning parameters: When the retrieval model is updated, bottom-layer basic features need to be updated in the first stage of training the embedding vector network. The set learning parameters are as shown in Table 1 and Table 2. It is not necessary to update the basic feature network and the embedding vector network in the second stage of training the quantization index network.

Set a learning rate: The basic feature network, the embedding vector network and the quantization index network all use a learning rate of lr1=0.005, and lr becomes 0.1 times of the original value after every 10 iterations.

Set a learning process: Full samples are subjected to epoch iteration. In each iteration, the full samples are processed in batches until an average epoch loss (which is a total loss of the retrieval model obtained by the weighted summation of the third error loss and the fourth error loss) under an epoch does not decrease.

Set specific operations in each iteration: All similar sample pairs are divided into Nb batches according to a batch-size. For each batch, the above n sample triplets are obtained.

Set a model parameter update: A stochastic gradient descent (SGD) method is used to perform gradient backward calculation on the loss functions obtained from the previous batch to obtain updated values of the parameters of the embedding vector network and the quantization index network, thus updating the network.

Figure 10:
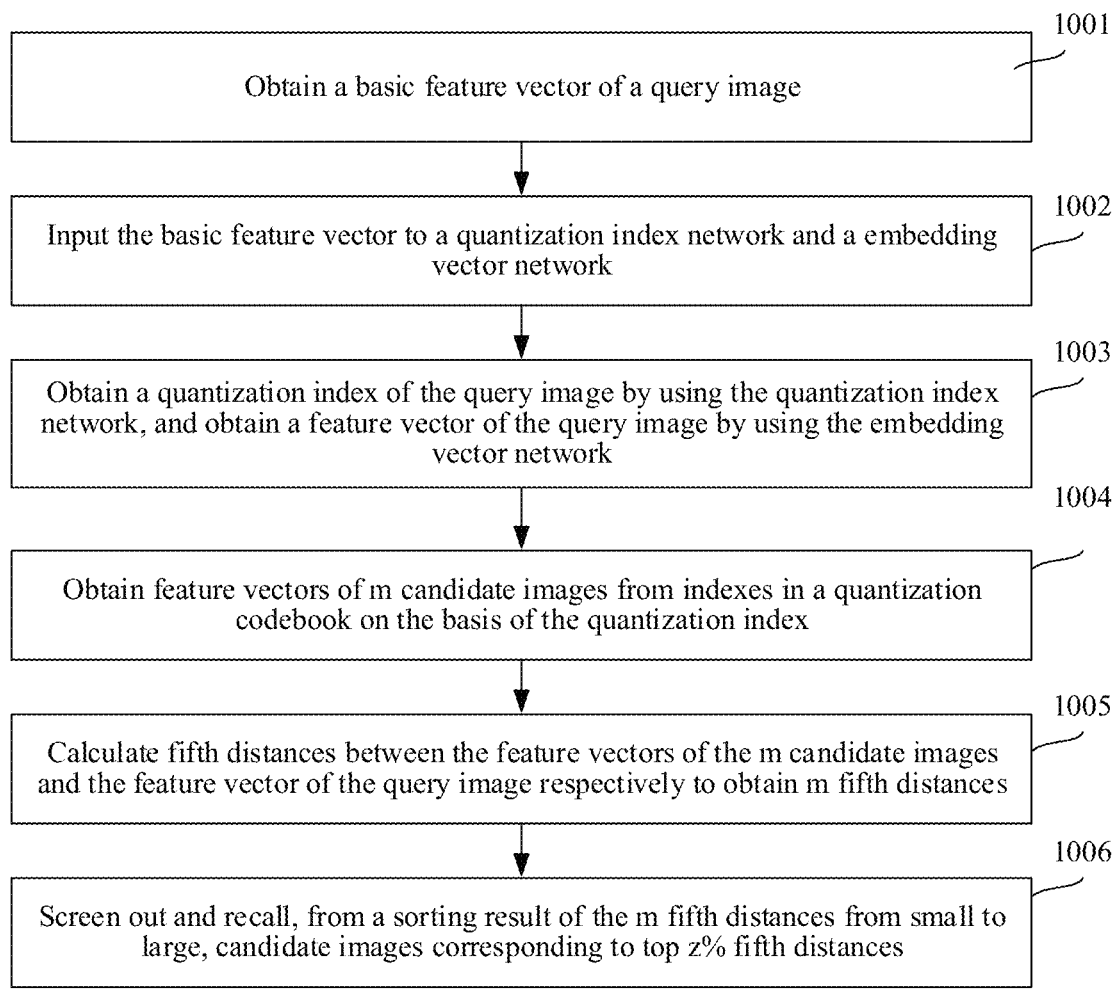
FIG. 10 is a flow chart of an image retrieval method according to one exemplary embodiment of this application.

In order to achieve object retrieval by constructing a deep quantization network, optionally, the object retrieval includes the following steps: 1. Obtain a basic feature vector of a query object. 2. Input the basic feature vector to the quantization index network and the embedding vector network. 3. Obtain a quantization index of the query object by using the quantization index network, and obtain a feature vector of the query object by using the embedding vector network. 4. Obtain feature vectors of m candidate objects from indexes in a quantization codebook on the basis of the quantization index, the quantization codebook storing mapping relationships between the quantization index and the feature vectors of the m candidate objects, and m being a positive integer. 5. Calculate fifth distances between the feature vectors of the m candidate objects and the feature vector of the query object respectively to obtain m fifth distances. 6. Screen out, according to a preset z value from a sorting result of the m fifth distances from small to large, candidate objects corresponding to top z % fifth distances, z being a positive number. Next, an example in which the query object is a query image is used for specific description. FIG. 10 is a flow diagram of an image retrieval method according to one exemplary embodiment of this application. In this embodiment, an example in which the method is implemented by the computer device in FIG. 2 is used for description. The method includes:

Step 1001. Obtain a basic feature vector of a query image.

The query image is an image used for image retrieval.

Figure 11:
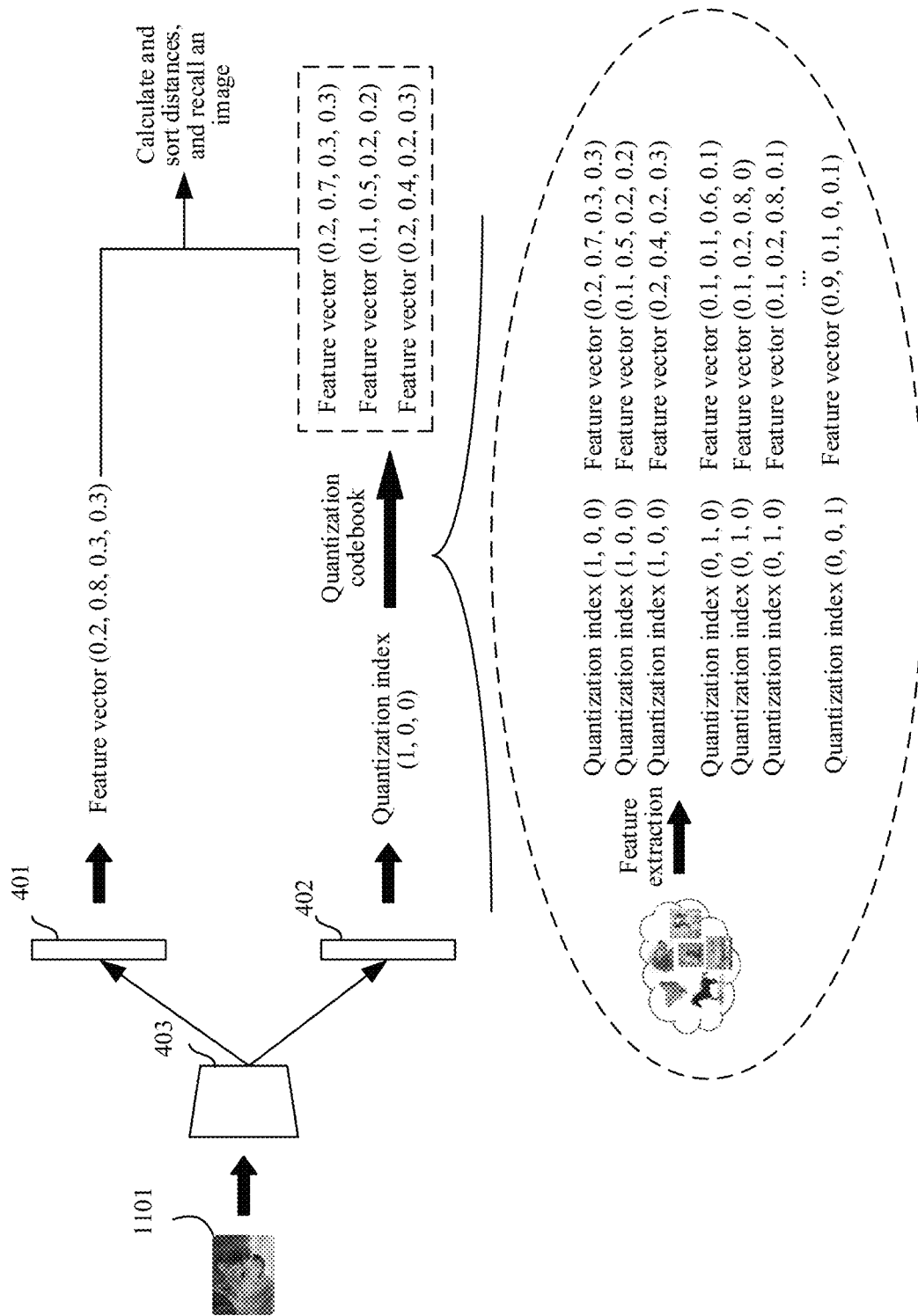
FIG. 11 is a schematic diagram of a system for using a retrieval model according to one exemplary embodiment of this application.

In one embodiment, the retrieval model also includes a basic feature network. Basic feature vectors of n sample triplets are obtained by using the basic feature network. Schematically, FIG. 11 shows a schematic diagram of a system for using a retrieval model according to one exemplary embodiment of this application. The basic feature vector of the query image 1101 can be obtained by inputting the query image 1101 to the basic feature network 403.

Step 1002. Input the basic feature vector to the quantization index network and the embedding vector network.

With reference to FIG. 11, the basic feature vector of the query image 1101 is input to the quantization index network 402 and the embedding vector network 401.

Step 1003. Obtain a quantization index of the query image by using the quantization index network, and obtain a feature vector of the query image by using the embedding vector network.

With reference to FIG. 11, the quantization index (1, 0, 0) of the query image 1101 is obtained by using the quantization index network 402, and the feature vector (0.2, 0.8, 0.3, 0.3) of the query image 1101 is obtained by using the embedding vector network 401.

Step 1004. Obtain feature vectors of m candidate objects from indexes in a quantization codebook on the basis of the quantization index.

The quantization codebook stores mapping relationships between the quantization index and the feature vectors of the m candidate objects, and m being a positive integer.

With reference to FIG. 11, the feature vectors of three candidate objects are obtained from the indexes in the quantization codebook on the basis of the quantization index (1, 0, 0): (0.2, 0.7, 0.3, 0.3), (0.1, 0.5, 0.2, 0.2) and (0.2, 0.4, 0.2, 0.3).

FIG. 11 further shows a process of constructing the quantization codebook according to one exemplary embodiment of this application. Features of all images in an image library are extracted to obtain quantization indexes and feature vectors.

In one embodiment, the quantization codebook is constructed by the following steps:

First, input any image i in the image library to the above retrieval model, where a feature vector e can be obtained by the embedding vector network 401, and a quantization index q can be obtained by the quantization index network 402 (q is a vector with each dimension of 0 or 1 obtained by a symbol function). A mapping table T [i: e] for the image i and the embedding vector network 401 is recorded (where i is a serial number of the image, and e is the feature vector output by the embedding vector network for the image i).

Second, record the serial numbers of images with the same q to a mapping table Linvert [i: q] of q, for example, {q1: [image 1, image 2, image 5], q2: [image 3], q3: [image 4]}, and save the list Lindex of all the quantization indexes: [q1, q2, q3].

Third, for an image i' newly added to the image library, calculate its qi' and ei'. When qi' exists in the list Lindex, directly add i' to the mapping table Linvert corresponding to qi' under Lindex, and add the serial numbers i' and ei' of images to the mapping table T (newly add a record of serial numbers and features, such as i': ei').

The list Lindex of the quantization indexes, the mapping table Linvert of q and the list T together form one quantization codebook.

In one embodiment, the step of obtaining feature vectors of m candidate objects from indexes in a quantization codebook on the basis of the quantization index includes: calculating the quantization index of the query image, determining, from the list Lindex, several quantization indexes at Hamming distances, less than a threshold, from the quantization index of the query image, determining, from the mapping table Linvert, the m candidate objects corresponding to the several quantization indexes, and determining the feature vectors of the m candidate objects from the mapping table T.

Step 1005. Calculate fifth distances between the feature vectors of the m candidate objects and the feature vector of the query image respectively to obtain m fifth distances.

With reference to FIG. 11, the fifth distances between the feature vector (0.2, 0.8, 0.3, 0.3) of the query image 1101 and the feature vectors of the three candidate objects are calculated respectively: (0.2, 0.7, 0.3, 0.3), (0.1, 0.5, 0.2, 0.2) and (0.2, 0.4, 0.2, 0.3), to obtain three fifth distances. The fifth distance is a European distance.

Step 1006. Screen out, according to a preset z value from a sorting result of the m fifth distances from small to large, candidate objects corresponding to top z % fifth distances.

With reference to FIG. 11, the candidate objects corresponding to the top z % fifth distances are screened out according to the preset z value from the sorting result of the three fifth distances from small to large, where z % can be obtained by pre-configuring the retrieval model. In some embodiments, the z value can be reasonably set according to retrieval requirements, so that the screened-out candidate objects meet a retrieval expectation of the retrieval model. z is a positive number.

In one embodiment, the computer device also sends the screened-out candidate objects to a client on which an image retrieval function is run.

In conclusion, the above method can sort the distances between the query image and the m candidate objects and screen out the top-sorted images by using the retrieval model including the basic feature network, the embedding vector network and the quantization index network. The above method not only realizes that the screened-out images are closer to the query image, but also avoids loss or additional addition of candidate objects during the determination of the m candidate objects.

Figure 12:
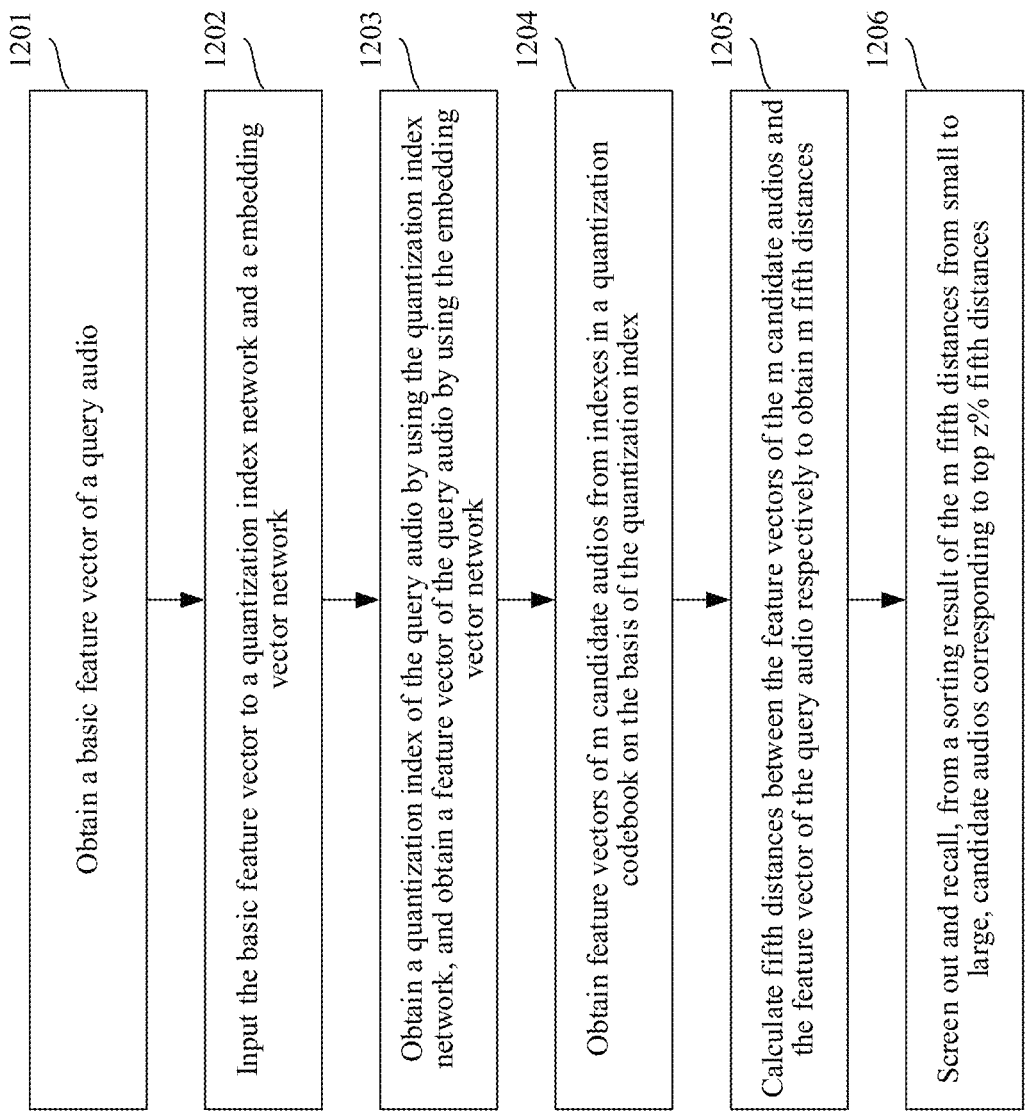
FIG. 12 is a flow diagram of an audio retrieval method according to one exemplary embodiment of this application.

FIG. 12 is a flow diagram of an audio retrieval method according to one exemplary embodiment of this application. In this embodiment, an example in which the method is implemented by the computer device in FIG. 2 is used for description. The method includes:

Step 1201. Obtain a basic feature vector of a query audio. The query audio is an audio for audio retrieval.

In one embodiment, the retrieval model further includes a basic feature network, and basic feature vectors of the n sample triplets are obtained by using the basic feature network.

Step 1202. Input the basic feature vector to the quantization index network and the embedding vector network.

For example, the basic feature vector of the query audio is input to the quantization index network and the embedding vector network.

Step 1203. Obtain a quantization index of the query audio by using the quantization index network, and obtain a feature vector of the query audio by using the embedding vector network.

For example, the quantization index (1, 0, 0) of the query audio is obtained by using the quantization index network, and the feature vector (0.2, 0.8, 0.3, 0.3) of the query audio is obtained by using the embedding vector network.

Step 1204. Obtain feature vectors of m candidate audios from indexes in a quantization codebook on the basis of the quantization index.

The quantization codebook stores mapping relationships between the quantization index and the feature vectors of the m candidate audios, and m being a positive integer.

For example, the feature vectors of three candidate audios are obtained from the indexes in the quantization codebook on the basis of the quantization index (1, 0, 0): (0.2, 0.7, 0.3, 0.3), (0.1, 0.5, 0.2, 0.2) and (0.2, 0.4, 0.2, 0.3).

In one embodiment, the quantization codebook is constructed by the following steps:

First, input any audio i in the audio library to the above retrieval model, where a feature vector e can be obtained by the embedding vector network 401, and a quantization index q can be obtained by the quantization index network 402 (q is a vector with each dimension of 0 or 1 obtained by a symbol function). A mapping table T [i: e] for the audio i and the embedding vector network 401 is recorded (where i is a serial number of the audio, and e is the feature vector output by the embedding vector network for the audio i).

Second, record the serial numbers of audios with the same q to a mapping table Linvert [i: q] of q, for example, {q1: [audio 1, audio 2, audio 5], q2: [audio 3], q3: [audio 4]}, and save the list Lindex of all the quantization indexes: [q1, q2, q3].

Third, for an audio i' newly added to the audio library, calculate its qi' and ei'. When qi' exists in the list Lindex, directly add i' to the mapping table Linvert corresponding to qi' under Lindex, and add the serial numbers i' and ei' of audios to the mapping table T (newly add a record of serial numbers and features, such as i': ei').

The list Lindex of the quantization indexes, the mapping table Linvert of q and the list T together form one quantization codebook.

In one embodiment, the step of obtaining feature vectors of m candidate audios from indexes in a quantization codebook on the basis of the quantization index includes:

calculating the quantization index of the query audio, determining, from the list Lindex, several quantization indexes at Hamming distances, less than a threshold, from the quantization index of the query audio, determining, from the mapping table Linvert, the m candidate audios corresponding to the several quantization indexes, and determining the feature vectors of the m candidate audios from the mapping table T.

Step 1205. Calculate fifth distances between the feature vectors of the m candidate audios and the feature vector of the query audio respectively to obtain m fifth distances.

For example, the fifth distances between the feature vector (0.2, 0.8, 0.3, 0.3) of the query audio 1101 and the feature vectors of the three candidate audios are calculated respectively: (0.2, 0.7, 0.3, 0.3), (0.1, 0.5, 0.2, 0.2) and (0.2, 0.4, 0.2, 0.3), to obtain three fifth distances. The fifth distance is a European distance.

Step 1206. Screen out, according to a preset z value from a sorting result of the m fifth distances from small to large, candidate audios corresponding to top z % fifth distances.

For example, the candidate audios corresponding to the top z % fifth distances are screened out according to the preset z value from the sorting result of the three fifth distances from small to large, where z % can be obtained by pre-configuring the retrieval model. In some embodiments, the z value can be reasonably set according to retrieval requirements, so that the screened-out candidate audios meet a retrieval expectation of the retrieval model. z is a positive number.

In one embodiment, the computer device also sends the screened-out candidate audios to a client on which an image retrieval function is run.

In conclusion, the above method can sort the distances between the query audio and the m candidate audios and screen out the top-sorted audios by using the retrieval model including the basic feature network, the embedding vector network and the quantization index network. The above method not only realizes that the screened-out audios are closer to the query audio, but also avoids loss or additional addition of candidate audios during the determination of the m candidate audios.

Figure 13:
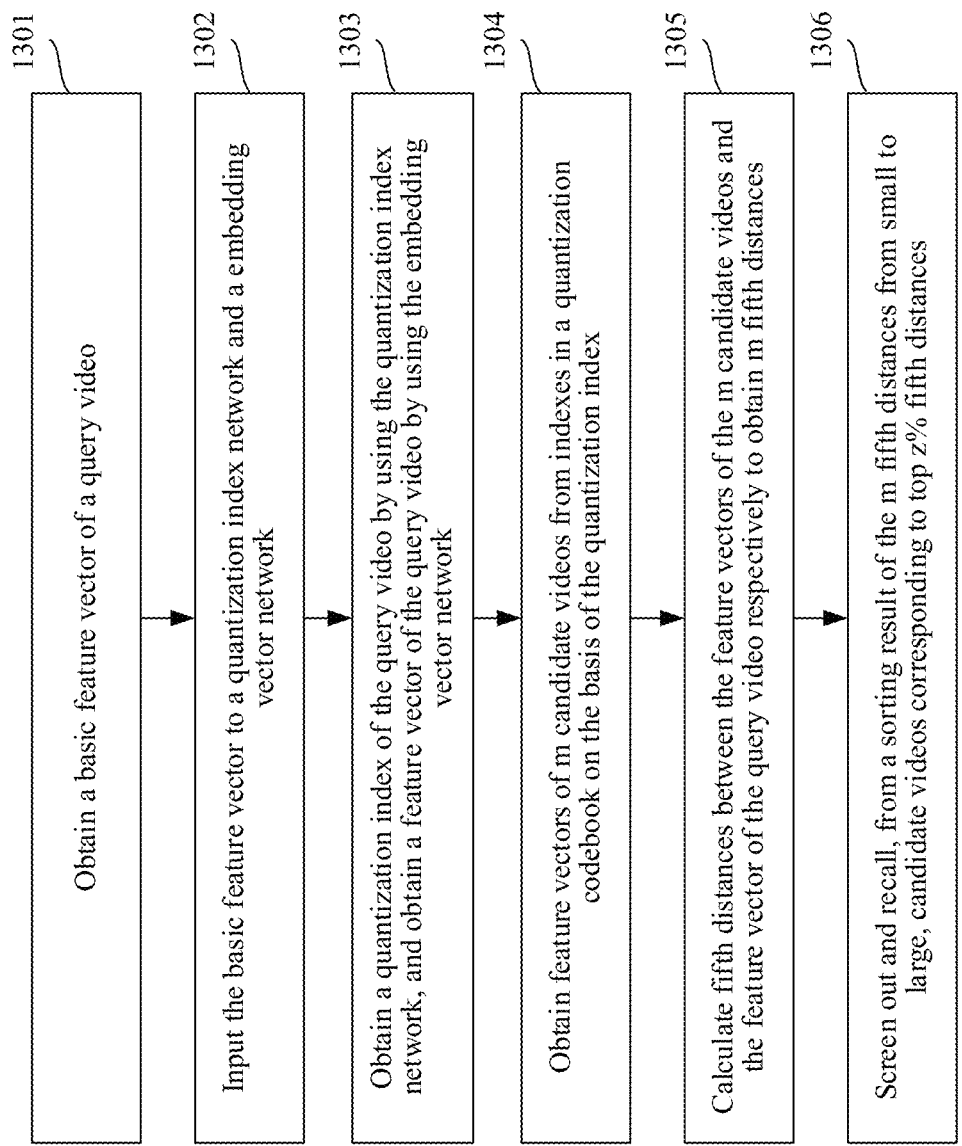
FIG. 13 is a flow diagram of a video retrieval method according to one exemplary embodiment of this application.

FIG. 13 is a flow diagram of a video retrieval method according to one exemplary embodiment of this application. In this embodiment, an example in which the method is implemented by the computer device in FIG. 2 is used for description. The method includes:

Step 1301. Obtain a basic feature vector of a query video. The query video is a video for video retrieval.

In one embodiment, the retrieval model further includes a basic feature network, and basic feature vectors of the n sample triplets are obtained by using the basic feature network.

Step 1302. Input the basic feature vector to the quantization index network and the embedding vector network.

For example, the basic feature vector of the query video is input to the quantization index network and the embedding vector network.

Step 1303. Obtain a quantization index of the query video by using the quantization index network, and obtain a feature vector of the query video by using the embedding vector network.

For example, the quantization index (1, 0, 0) of the query video is obtained by using the quantization index network, and the feature vector (0.2, 0.8, 0.3, 0.3) of the query video is obtained by using the embedding vector network.

Step 1304. Obtain feature vectors of m candidate videos from indexes in a quantization codebook on the basis of the quantization index.

The quantization codebook stores mapping relationships between the quantization index and the feature vectors of the m candidate videos, and m being a positive integer.

For example, the feature vectors of three candidate videos are obtained from the indexes in the quantization codebook on the basis of the quantization index (1, 0, 0): (0.2, 0.7, 0.3, 0.3), (0.1, 0.5, 0.2, 0.2) and (0.2, 0.4, 0.2, 0.3).

In one embodiment, the quantization codebook is constructed by the following steps:

First, input any video i in the video library to the above retrieval model, where a feature vector e can be obtained by the embedding vector network 401, and a quantization index q can be obtained by the quantization index network 402 (q is a vector with each dimension of 0 or 1 obtained by a symbol function). A mapping table T [i: e] for the video i and the embedding vector network 401 is recorded (where i is a serial number of the video, and e is the feature vector output by the embedding vector network for the video i).

Second, record the serial numbers of videos with the same q to a mapping table Linvert [i: q] of q, for example, {q1: [video 1, video 2, video 5], q2: [video 3], q3: [video 4]}, and save the list Lindex of all the quantization indexes: [q1, q2, q3].

Third, for a video i' newly added to the video library, calculate its qi' and ei'. When qi' exists in the list Lindex, directly add i' to the mapping table Linvert corresponding to qi' under Lindex, and add the serial numbers i' and ei' of videos to the mapping table T (newly add a record of serial numbers and features, such as i': ei').

The list Lindex of the quantization indexes, the mapping table Linvert of q and the list T together form one quantization codebook.

In one embodiment, the step of obtaining feature vectors of m candidate videos from indexes in a quantization codebook on the basis of the quantization index includes: calculating the quantization index of the query video, determining, from the list Lindex, several quantization indexes at Hamming distances, less than a threshold, from the quantization index of the query video, determining, from the mapping table Linvert, the m candidate videos corresponding to the several quantization indexes, and determining the feature vectors of the m candidate videos from the mapping table T.

Step 1305. Calculate fifth distances between the feature vectors of the m candidate videos and the feature vector of the query video respectively to obtain m fifth distances.

For example, the fifth distances between the feature vector (0.2, 0.8, 0.3, 0.3) of the query video 1101 and the feature vectors of the three candidate videos are calculated respectively: (0.2, 0.7, 0.3, 0.3), (0.1, 0.5, 0.2, 0.2) and (0.2, 0.4, 0.2, 0.3), to obtain three fifth distances. The fifth distance is a European distance.

Step 1306. Screen out, according to a preset z value from a sorting result of the m fifth distances from small to large, candidate videos corresponding to top z % fifth distances.

For example, the candidate videos corresponding to the top z % fifth distances are screened out according to the preset z value from the sorting result of the three fifth distances from small to large, where z % can be obtained by pre-configuring the retrieval model. In some embodiments, the z value can be reasonably set according to retrieval requirements, so that the screened-out candidate videos meet a retrieval expectation of the retrieval model. z is a positive number.

In one embodiment, the computer device also sends the screened-out candidate videos to a client on which an image retrieval function is run.

In conclusion, the above method can sort the distances between the query video and the m candidate videos and screen out the top-sorted videos by using the retrieval model including the basic feature network, the embedding vector network and the quantization index network. The above method not only realizes that the screened-out videos are closer to the query video, but also avoids loss or additional addition of candidate videos during the determination of the m candidate videos.

Figure 14:
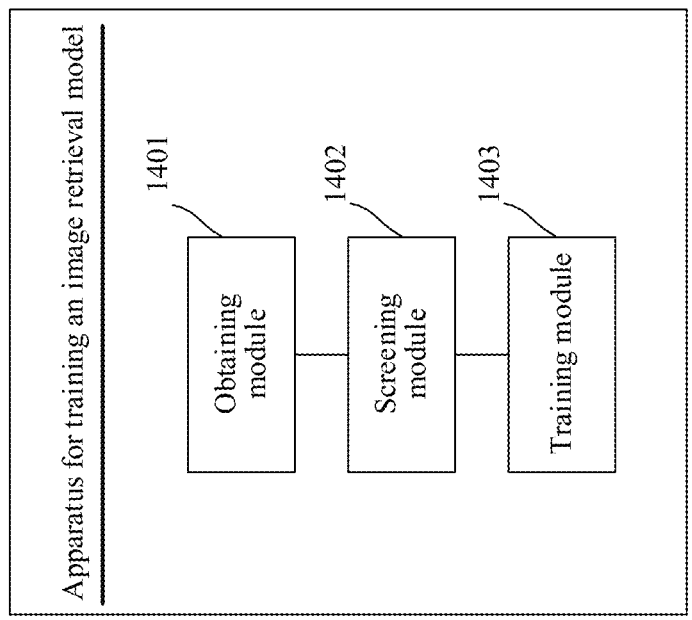
FIG. 14 is a structural block diagram of an apparatus for training a retrieval model according to one exemplary embodiment of this application.

FIG. 14 is a structural block diagram of an apparatus for training a retrieval model according to one exemplary embodiment of this application. The retrieval model includes an embedding vector network and a quantization index network. The embedding vector network is used for obtaining a feature vector of an image, and the quantization index network is used for extracting a quantization index of the image. The apparatus for training a retrieval model includes:

an obtaining module 1401, configured to obtain n sample triplets used for training the retrieval model; the sample triplets each including a training sample, a positive sample that constitutes a similar sample pair with the training sample, and a negative sample that does not constitute a similar sample pair with the training sample, and n being a positive integer greater than 1;

a screening module 1402, configured to input basic feature vectors of the n sample triplets to the embedding vector network; and screen out, according to errors of feature vectors output by the embedding vector network, a first sample triplet set used for training the quantization index network;

the screening module 1402 being further configured to: input the basic feature vectors of the n sample triplets to the quantization index network; screen out, according to errors of quantization indexes output by the quantization index network, a second sample triplet set used for training the embedding vector network; and a training module 1403, configured to train the quantization index network on the basis of the first sample triplet set, and train the embedding vector network on the basis of the second sample triplet set.

In one embodiment, the screening module 1402 is further configured to obtain n groups of triplet feature vectors output by the embedding vector network for the n sample triplets.

In one embodiment, the screening module 1402 is further configured to calculate n first error losses corresponding to then groups of triplet feature vectors.

In one embodiment, the screening module 1402 is further configured to: screen out, from a sorting result of the n first error losses from small to large, sample triplets corresponding to $n_1$ first error losses falling within a first selection range, and add the sample triplets to the first sample triplet set used for training the quantization index network.

In one embodiment, the screening module 1402 is further configured to calculate, for each group of the triplet feature vectors, a first distance between a feature vector of the training sample and a feature vector of the positive sample.

In one embodiment, the screening module 1402 is further configured to calculate, for each group of the triplet feature vectors, a second distance between the feature vector of the training sample and a feature vector of the negative sample.

In one embodiment, the screening module 1402 is further configured to calculate a first error loss between a difference value of the first distance and the second distance and a first distance threshold, the first distance threshold being a threshold of a difference value between a distance from the training sample to the positive sample and a distance from the training sample to the negative sample.

In one embodiment, the screening module 1402 is further configured to screen out, according to a preset x value from the sorting result of the n first error losses from small to large, the sample triplets corresponding to the top x % $n_1$ first error losses, and add the sample triplets to the first sample triplet set used for training the quantization index network, $n_1$ being a positive integer less than n. x is a positive number.

In one embodiment, the screening module 1402 is further configured to obtain n groups of triplet quantization indexes output by the quantization index network for the n sample triplets.

In one embodiment, the screening module 1402 is further configured to calculate n second error losses corresponding to the n groups of triplet quantization indexes.

In one embodiment, the screening module 1402 is further configured to: screen out, from a sorting result of the n second error losses from small to large, sample triplets corresponding to $n_2$ second error losses falling within a second selection range, and add the sample triplets to the second sample triplet set used for training the embedding vector network, $n_2$ being a positive integer less than n.

In one embodiment, the screening module 1402 is further configured to calculate, for each group of triplet quantization indexes, a first triplet loss of the triplet quantization indexes.

In one embodiment, the screening module 1402 is further configured to calculate, for each group of triplet quantization indexes, a first quantization error loss of the triplet quantization indexes.

In one embodiment, the screening module 1402 is further configured to perform weighted summation on the first triplet loss and the first quantization error loss to obtain the second error loss.

In one embodiment, the screening module 1402 is further configured to: screen out, according to a preset y value from the sorting result of the n second error losses from small to large, the sample triplets corresponding to the top y % $n_2$ second error losses are screened out, and add the sample triplets to the second sample triplet set used for training the quantization index network. y is a positive number.

In one embodiment, the training module 1403 is further configured to input the first sample triplet set is input to the quantization index network to obtain $n_1$ third error losses.

In one embodiment, the training module 1403 is further configured to train the quantization index network on the basis of the $n_1$ third error losses.

In one embodiment, the training module 1403 is further configured to calculate, for each sample triplet of the first sample triplet set, a second triplet loss of the triplet feature vector.

In one embodiment, the training module 1403 is further configured to calculate, for each sample triplet of the first sample triplet set, a second quantization error loss of the triplet feature vector.

In one embodiment, the training module 1403 is further configured to perform weighted summation on the second triplet loss and the second quantization error loss to obtain the third error loss.

In one embodiment, the training module 1403 is further configured to input the second sample triplet set to the embedding vector network to obtain $n_2$ fourth error losses.

In one embodiment, the training module 1403 is further configured to train the embedding vector network on the basis of the $n_2$ fourth error losses.

In one embodiment, the training module 1403 is further configured to calculate, for each sample triplet of the second sample triplet set, a third distance between a feature vector of the training sample and a feature vector of the positive sample.

In one embodiment, the training module 1403 is further configured to calculating, for each sample triplet of the second sample triplet set, a fourth distance between the feature vector of the training sample and a feature vector of the negative sample.

In one embodiment, the training module 1403 is further configured to calculate a fourth error loss between a difference value of the third distance and the fourth distance and a second distance threshold, the second distance threshold being a threshold of a difference value between a distance from the training sample to the positive sample and a distance from the training sample to the negative sample.

In one embodiment, the retrieval model further includes a basic feature network.

In one embodiment, the obtaining module 1401 is further configured to obtain basic feature vectors of the n sample triplets by using the basic feature network.

In conclusion, according to the apparatus for training a retrieval model, the embedding vector network and the quantization index network are trained by using the sample triplets, so that the first sample triplet set screened out by using the embedding vector network is used as the sample triplets for training the quantization index network, and the second sample triplet set screened out by using the quantization index network is used as the sample triplets for training the embedding vector network. The above apparatus for training a retrieval model eliminates the influence of noise sample triplets among the sample triplets, and makes a prediction effect of the quantization index network on the positive and negative samples similar to a prediction effect of the embedding vector network on the positive and negative samples. Two branches predict the noise sample triplets, and the two branches learn high-performance sample triplets from each other, so that denoising learning is achieved, and the two branches have similar prediction effects.

Figure 15:
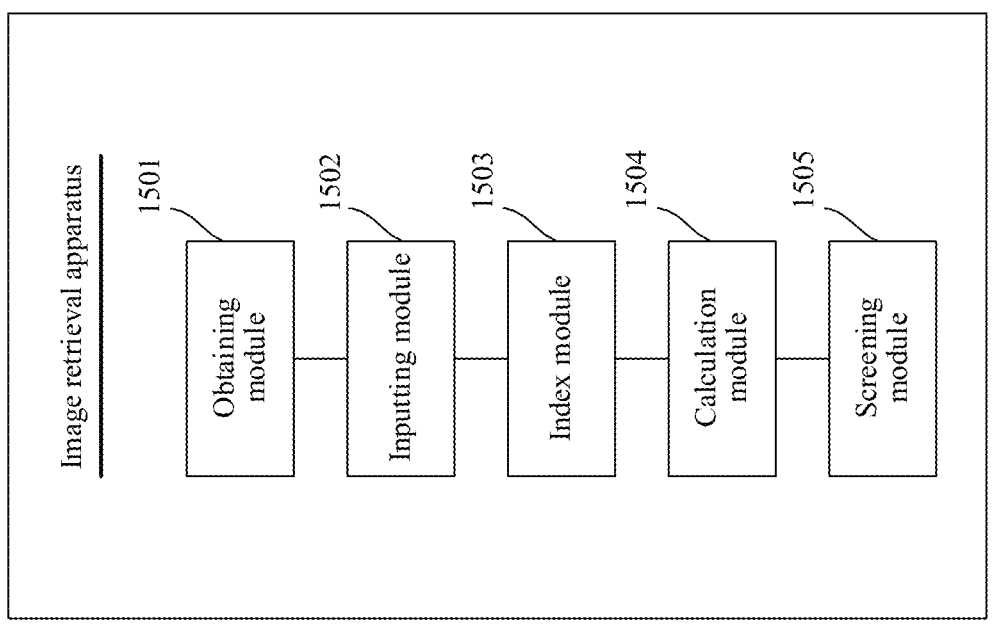
FIG. 15 is a structural block diagram of an object retrieval apparatus according to one exemplary embodiment of this application.

FIG. 15 shows a structural block diagram of an object retrieval apparatus according to one exemplary embodiment of this application.

an obtaining module 1501, configured to obtain a basic feature vector of a query object;

an inputting module 1502, configured to input the basic feature vector to the quantization index network and the embedding vector network;

the obtaining module 1501 being further configured to: obtain a quantization index of the query object by using the quantization index network, and obtain a feature vector of the query object by using the embedding vector network;

an index module 1503, configured to obtain feature vectors of m candidate objects from indexes in a quantization codebook on the basis of the quantization index; the quantization codebook storing mapping relationships between the quantization index and the feature vectors of the m candidate objects, and m being a positive integer;

a calculation module 1504, configured to calculate fifth distances between the feature vectors of the m candidate objects and the feature vector of the query object respectively to obtain m fifth distances; and a screening module 1505, configured to screen out, according to a preset z value from a sorting result of the m fifth distances from small to large, candidate objects corresponding to top z % fifth distances, z being a positive number.

In one embodiment, the obtaining module 1501 is further configured to generate a basic feature vector of a query image by using the basic feature network of the retrieval model.

In conclusion, the above retrieval apparatus can sort the distances between the query object and the m candidate objects and screen out the top-sorted objects by using the retrieval model including the basic feature network, the embedding vector network and the quantization index network. The above object retrieval apparatus not only realizes that the screened-out objects are closer to the query object, but also avoids loss or additional addition of candidate objects during the determination of the m candidate objects.

The apparatus for training object retrieval and the object retrieval apparatus provided by the above embodiments are only illustrated by dividing the functional modules. In practical applications, the foregoing functions may be allocated to and completed by different functional modules as required, that is, an inner structure of a device is divided into different functional modules, so as to complete all or some of the functions described above. In addition, the apparatus for training a retrieval model provided in the foregoing embodiment belongs to the same concept as the embodiment of the method for training a retrieval model, and for the specific implementation process of the apparatus, refer to the method embodiment, and details are not described herein again.

Figure 16:
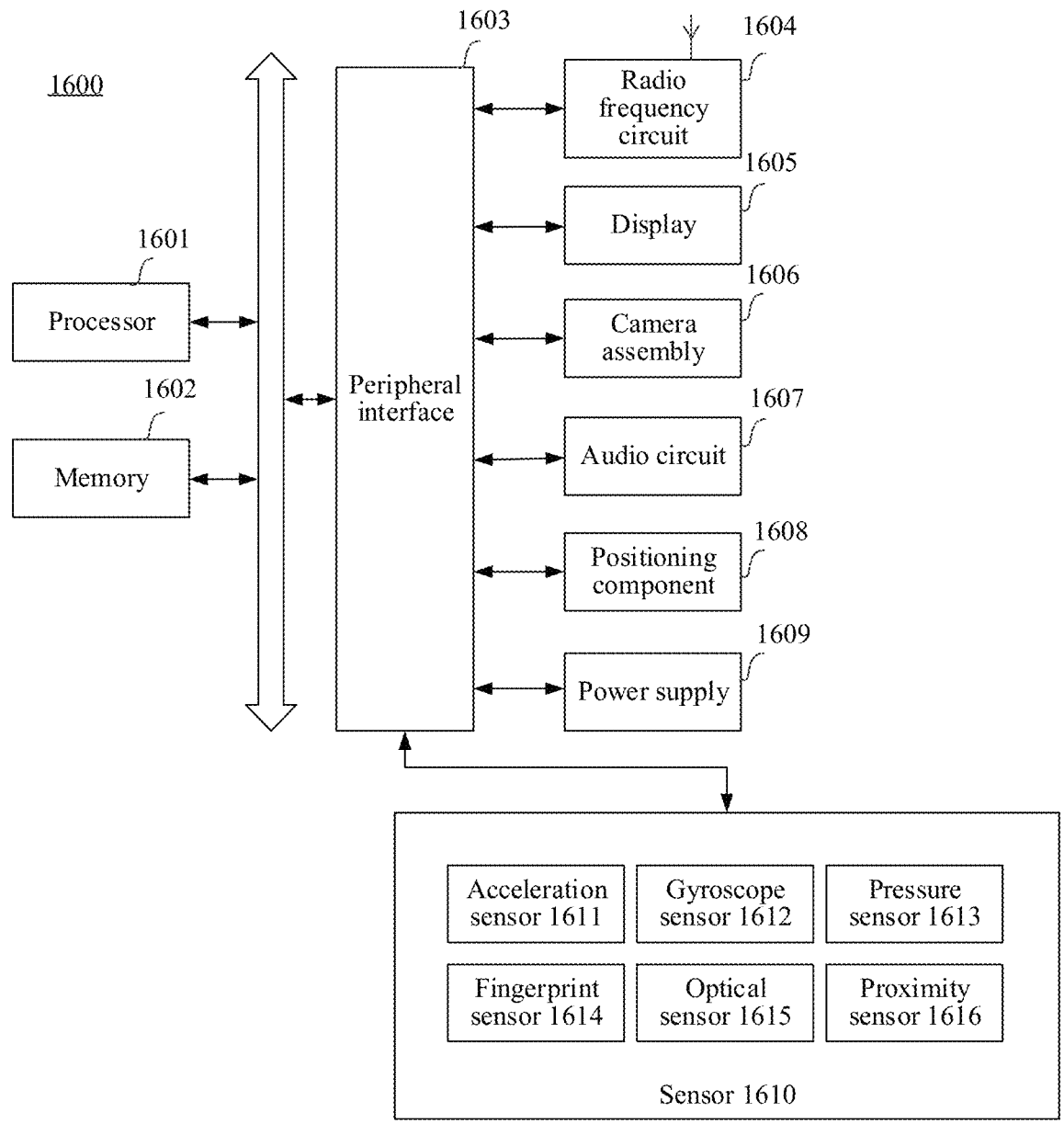
FIG. 16 is a structural block diagram of a computer device according to one exemplary embodiment of this application.

FIG. 16 shows a structural block diagram of a computer device 1600 according to one exemplary embodiment of this application. The computer device can be a terminal or a server. In this embodiment, it can be simply described as a terminal training a retrieval model alone and/or a terminal using a retrieval model alone, or a server training a retrieval model alone and/or a server using a retrieval model alone, or a terminal and a server training a retrieval model together and/or a terminal and a server using a retrieval model together.

Usually, the computer device 1600 includes: a processor 1601 and a memory 1602.

The processor 1601 may include one or more processing cores, for example, a 4-core processor or an 8-core processor. The processor 1601 may be implemented in at least one hardware form of a digital signal processor (DSP), a field-programmable gate array (FPGA), and a programmable logic array (PLA). The processor 1601 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1601 may be integrated with a graphics processing unit (GPU). The GPU is configured to render and draw content that needs to be displayed on a display screen. In some embodiments, the processor 1601 may further include an AI processor. The AI processor is configured to process computing operations related to machine learning.

The memory 1602 may include one or more non-transitory computer-readable storage media. The computer-readable storage medium may be non-transient. The memory 1602 may further include a high-speed random access memory and a nonvolatile memory, for example, one or more disk storage devices or flash storage devices. In some embodiments, the non-transitory computer-readable storage medium in the memory 1602 is configured to store at least one instruction, the at least one instruction being configured to be executed by the processor 1601 to implement the method for training a retrieval model or the image retrieval method provided by the method embodiments in this application.

In some embodiments, the computer device 1600 may optically include: a peripheral interface 1603 and at least one peripheral. The processor 1601, the memory 1602, and the peripheral interface 1603 may be connected through a bus or a signal cable. Each peripheral may be connected to the peripheral interface 1603 through a bus, a signal cable, or a circuit board. Specifically, the peripheral includes: at least one of a radio frequency circuit 1604, a display screen 1605, a camera component 1606, an audio circuit 1607, a positioning component 1608, and a power supply 1609.

The peripheral interface 1603 may be configured to connect the at least one peripheral related to input/output (I/O) to the processor 1601 and the memory 1602. In some embodiments, the processor 1601, the memory 1602 and the peripheral interface 1603 are integrated on the same chip or circuit board. In some other embodiments, any one or two of the processor 1601, the memory 1602 and the peripheral device interface 1603 can be implemented on a single chip or circuit board. This is not limited in this embodiment.

The radio frequency circuit 1604 is configured to receive and transmit a radio frequency (RF) signal, also referred to as an electromagnetic signal.

The display screen 1605 is configured to display a user interface (UI).

The camera component 1606 is configured to capture images or videos.

The audio circuit 1607 may include a microphone and a speaker.

The power supply 1609 is configured to supply power to the various components in the computer device 1600.

In some embodiments, the computer device 1600 further includes one or more sensors 1610. The one or more sensors 1610 include but are not limited to: an acceleration sensor 1611, a gyroscope sensor 1612, a pressure sensor 1613, a fingerprint sensor 1614, an optical sensor 1615, and a proximity sensor 1616.

A person skilled in the art may understand that the structure shown in FIG. 16 constitutes no limitation on the computer device 1600, and the computer device may include more or fewer components than those shown in the figure, or some components may be combined, or a different component deployment may be used.

This application further provides a non-transitory computer-readable storage medium, which stores at least one instruction, at least one program, a code set or an instruction set. The at least one instruction, the at least one program, the code set, or the instruction set is loaded or executed by a processor to implement the method for training a retrieval model or the object retrieval method according to the above method embodiment.

This application further provides a computer program product or a computer program, the computer program product or the computer program including computer instructions stored in a computer-readable memory. A processor of a computer device reads the computer instructions from the computer-readable storage medium and executes the computer instructions, causing the computer device to implement the method for training a retrieval model or the object retrieval method provided by the above method embodiment.

Figure 17:
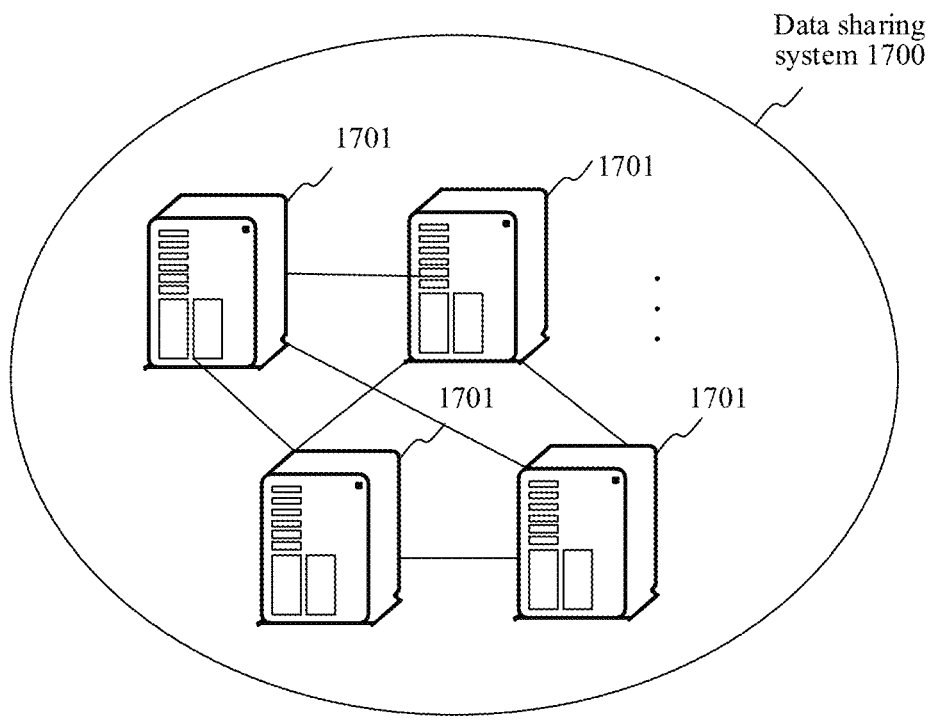
FIG. 17 is a schematic diagram of a data sharing system according to one exemplary embodiment of this application.

In one embodiment, the sample triplet, the basic feature vectors output by the basic feature network, the feature vectors output by the embedding vector network, and the quantization indexes output by the quantization index network can be stored in nodes of a data sharing system. Referring to a data sharing system shown in FIG. 17, the data sharing system 1700 is a system for data sharing between nodes. The data sharing system include a plurality of nodes 1701. The plurality of nodes 1701 may refer to various clients in the data sharing system. Each node 1701 may receive input information during normal work, and maintain shared data in the data sharing system on the basis of the received input information. To ensure mutual information communication in the data sharing system, information connection may exist between each node in the data sharing system, and information can be transmitted between the nodes by using the above information connection. For example, when any node in the data sharing system receives input information, other nodes in the data sharing system obtain the input information according to a consensus algorithm, and store the input information as shared data, so that data stored on all nodes in the data sharing system is consistent.

Each node in the data sharing system has its corresponding node identifier, and each node in the data sharing system can store the node identifiers of other nodes in the data sharing system, so that generated blocks can be broadcast to other nodes in the data sharing system according to the node identifiers of other nodes. Each node can maintain a node identifier list as shown in the following table, and correspondingly store node names and the node identifiers to the node identifier list. A node identifier may be an Internet protocol (IP, a protocol for interconnection between networks) address or any other type of information capable of identifying the node. Only an IP address is taken as an example for illustration in Table 4.

TABLE 4

| Node name | Node identifier |
| --- | --- |
| Node 1 | 117.114.151.174 |
| Node 2 | 117.116.189.145 |
| ... | ... |
| Node N | 119.123.789.258 |

Figure 18:
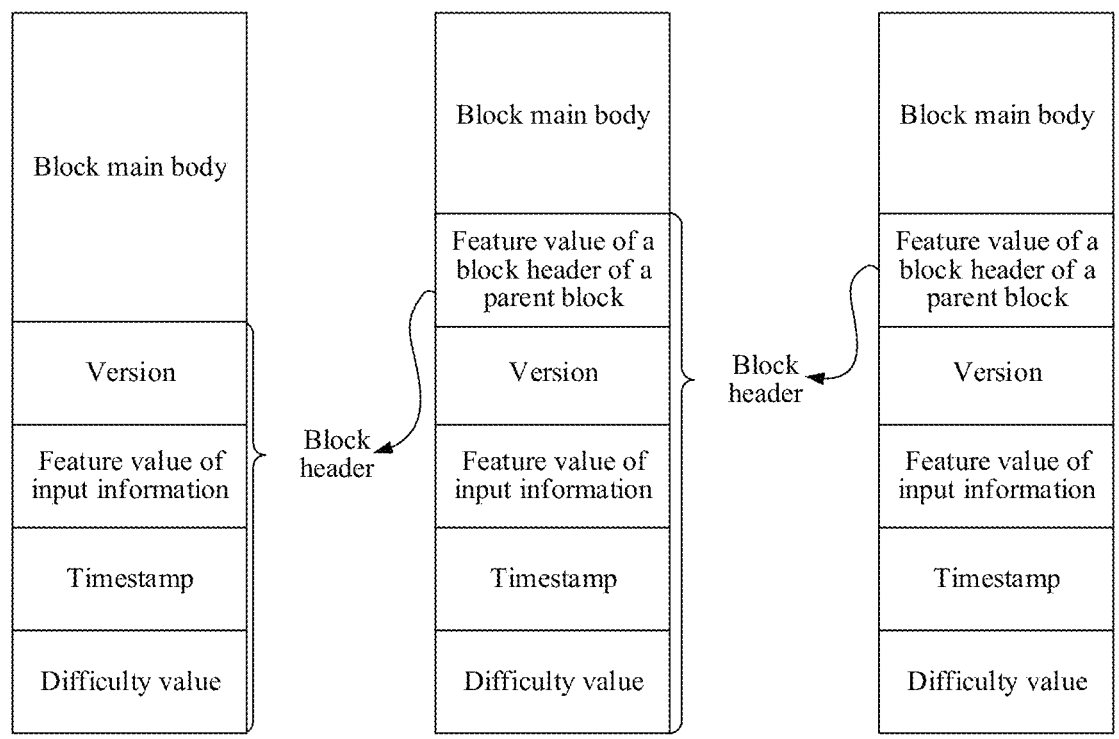
FIG. 18 is a schematic diagram of a blockchain structure according to one exemplary embodiment of this application.

Each node in the data sharing system stores an identical blockchain. The blockchain is composed of a plurality of blocks, as shown in FIG. 18. The blockchain is composed of a plurality of blocks. An originator block includes a block header and a block main body. The block header stores a feature value, a version number, a timestamp and a difficulty value of the input information, and the block main body stores the input information. A next block of the originator block takes the originator block as a parent block. The next block also includes a block header and a block main body. The block header stores a feature value of the input information of the current block, and the feature value, the version number, the timestamp and the difficulty value of the block header of the parent block, and the rest can be done in the same manner, so that block data stored in each block in the blockchain is associated with block data stored in the parent block, which ensures the security of the input information in the blocks.

Figure 19:
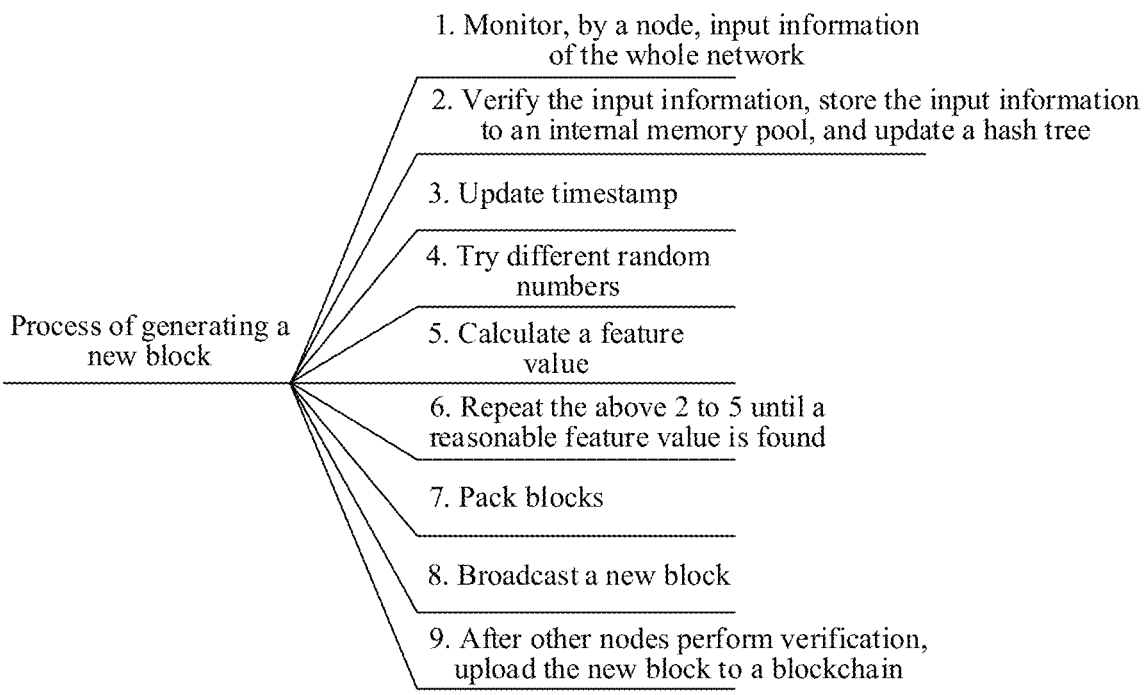
FIG. 19 is a schematic diagram of a new block generation process according to one exemplary embodiment of this application.

When the various blocks in the blockchain are generated, that is, referring to FIG. 19, when a node where the blockchain is located receives input information, the node checks the input information. After the verification, the node stores the input information to an internal memory pool and updates its hash tree used for recording the input information. After that, the node updates the timestamp to time of receiving the input information, and tries different random numbers to calculate feature values for several times, so that the calculated feature values can satisfy the following formula:

$$SHA256(SHA256(version+prev\_hash+merkle\_root+ntime+nbits+x)) < TARGET$$

where SHA256 is a feature value algorithm used for calculating a feature value; version (version number) is version information of relevant block protocols in the blockchain; prev_Hash is the feature value of the block header of the parent block of the current block; merkle_Root is the feature value of the input information; name is the update time for updating the timestamp; nbits is a current difficulty, which is a fixed value for a period of time, and will be determined again after exceeding the fixed period of time; x is a random number; TARGET is a feature value threshold, which can be determined according to nbits.

In this way, when the random number satisfying the above formula is calculated, the information can be stored correspondingly, to generate the block header and the block main body and obtain the current block. Then, the node where the blockchain is located sends the newly generated block to other nodes in the data sharing system according to the node identifiers of other nodes in the data sharing system. Other nodes verify the newly generated block, and add, after the verification is completed, the newly generated block to blockchains stored in the nodes.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for training a retrieval model performed by a computer device, the retrieval model comprising a basic feature network, an embedding vector network and a quantization index network, and the method comprising:
    obtaining n sample triplets used for training the retrieval model, each sample triplet comprising a training sample, a positive sample that constitutes a similar sample pair with the training sample, and a negative sample that does not constitute a similar sample pair with the training sample, and n being a positive integer greater than 1;
    obtaining basic feature vectors of the n sample triplets by using the basic feature network;
    inputting the basic feature vectors of the n sample triplets to the embedding vector network to identify a first sample triplet set according to errors of feature vectors output by the embedding vector network;
    inputting the basic feature vectors of the n sample triplets to the quantization index network to identify a second sample triplet set according to errors of quantization indexes output by the quantization index network;

training the quantization index network and the embedding vector network on the basis of the first sample triplet set and the second sample triplet set;

obtaining a basic feature vector of a query object;

inputting the basic feature vector to the quantization index network and the embedding vector network;

obtaining a quantization index of the query object by using the quantization index network, and obtaining a feature vector of the query object by using the embedding vector network;

obtaining feature vectors of m candidate objects from indexes in a quantization codebook on the basis of the quantization index; and identifying, among the m candidate objects, top z candidate objects whose associated feature vectors are within a predefined distance from the feature vector of the query object, z being a positive number.

2. The method according to claim 1, wherein the inputting the basic feature vectors of the n sample triplets to the embedding vector network to identify a first sample triplet set according to errors of feature vectors output by the embedding vector network comprises:

obtaining n groups of triplet feature vectors output by the embedding vector network for the n sample triplets;

calculating n first error losses corresponding to the n groups of triplet feature vectors;

identifying sample triplets corresponding to $n_1$ first error losses falling within a first selection range; and adding the sample triplets to the first sample triplet set used for training the quantization index network, $n_1$ being a positive integer less than n.

3. The method according to claim 1, wherein the inputting the basic feature vectors of the n sample triplets to the quantization index network to identify a second sample triplet set according to errors of quantization indexes output by the quantization index network comprises:

obtaining n groups of triplet quantization indexes output by the quantization index network for the n sample triplets;

calculating n second error losses corresponding to the n groups of triplet quantization indexes;

identifying sample triplets corresponding to n2 second error losses falling within a second selection range; and adding the sample triplets to the second sample triplet set used for training the embedding vector network, n2 being a positive integer less than n.

4. The method according to claim 1, wherein the training the quantization index network on the basis of the first sample triplet set comprises:

calculating, for each sample triplet of the first sample triplet set, a second triplet loss of the triplet feature vector by using the quantization index network, the triplet feature vector being a feature vector output by the embedding vector network, and the first sample triplet set comprising $n_1$ sample triplets;

calculating, for each sample triplet of the first sample triplet set, a second quantization error loss of the triplet feature vector by using the quantization index network;

performing weighted summation on the second triplet loss and the second quantization error loss to obtain a third error loss; and training the quantization index network on the basis of the $n_1$ third error losses.

5. The method according to claim 1, wherein the training the embedding vector network on the basis of the second sample triplet set comprises:

calculating, for each sample triplet of the second sample triplet set, a third distance between a feature vector of the training sample and a feature vector of the positive sample by using the embedding vector network, the second sample triplet set comprising $n_2$ sample triplets;

calculating, for each sample triplet of the second sample triplet set, a fourth distance between the feature vector of the training sample and a feature vector of the negative sample by using the embedding vector network;

calculating a fourth error loss between a difference value of the third distance and the fourth distance and a second distance threshold, the second distance threshold being a threshold of a difference value between a distance from the training sample to the positive sample and a distance from the training sample to the negative sample; and training the embedding vector network on the basis of the $n_2$ fourth error losses.

6. A computer device, comprising: a processor and a memory, the memory storing a computer program that, when executed by the processor, causes the computer device to implement a method for training a retrieval model, the retrieval model comprising a basic feature network, an embedding vector network and a quantization index network, the method including:

obtaining n sample triplets used for training the retrieval model, each sample triplet comprising a training sample, a positive sample that constitutes a similar sample pair with the training sample, and a negative sample that does not constitute a similar sample pair with the training sample, and n being a positive integer greater than 1;

obtaining basic feature vectors of the n sample triplets by using the basic feature network;

inputting the basic feature vectors of the n sample triplets to the embedding vector network to identify a first sample triplet set according to errors of feature vectors output by the embedding vector network;

inputting the basic feature vectors of the n sample triplets to the quantization index network to identify a second sample triplet set according to errors of quantization indexes output by the quantization index network;

training the quantization index network and the embedding vector network on the basis of the first sample triplet set and the second sample triplet set;

obtaining a basic feature vector of a query object;

inputting the basic feature vector to the quantization index network and the embedding vector network;

obtaining a quantization index of the query object by using the quantization index network, and obtaining a feature vector of the query object by using the embedding vector network;

obtaining feature vectors of m candidate objects from indexes in a quantization codebook on the basis of the quantization index; and identifying, among the m candidate objects, top z candidate objects whose associated feature vectors are within a predefined distance from the feature vector of the query object, z being a positive number.

7. The computer device according to claim 6, wherein the inputting basic feature vectors of the n sample triplets to the embedding vector network to identify a first sample triplet set according to errors of feature vectors output by the embedding vector network comprises:

obtaining n groups of triplet feature vectors output by the embedding vector network for the n sample triplets;

calculating n first error losses corresponding to the n groups of triplet feature vectors;

identifying sample triplets corresponding to $n_1$ first error losses falling within a first selection range; and adding the sample triplets to the first sample triplet set used for training the quantization index network, $n_1$ being a positive integer less than n.

8. The computer device according to claim 6, wherein the inputting the basic feature vectors of the n sample triplets to the quantization index network to identify a second sample triplet set according to errors of quantization indexes output by the quantization index network comprises:

obtaining n groups of triplet quantization indexes output by the quantization index network for the n sample triplets;

calculating n second error losses corresponding to the n groups of triplet quantization indexes;

identifying sample triplets corresponding to $n_2$ second error losses falling within a second selection range; and adding the sample triplets to the second sample triplet set used for training the embedding vector network, $n_2$ being a positive integer less than n.

9. The computer device according to claim 6, wherein the training the quantization index network on the basis of the first sample triplet set comprises:

calculating, for each sample triplet of the first sample triplet set, a second triplet loss of the triplet feature vector by using the quantization index network, the triplet feature vector being a feature vector output by the embedding vector network, and the first sample triplet set comprising $n_1$ sample triplets;

calculating, for each sample triplet of the first sample triplet set, a second quantization error loss of the triplet feature vector by using the quantization index network;

performing weighted summation on the second triplet loss and the second quantization error loss to obtain a third error loss; and training the quantization index network on the basis of the $n_1$ third error losses.

10. The computer device according to claim 6, wherein the training the embedding vector network on the basis of the second sample triplet set comprises:

calculating, for each sample triplet of the second sample triplet set, a third distance between a feature vector of the training sample and a feature vector of the positive sample by using the embedding vector network, the second sample triplet set comprising $n_2$ sample triplets;

calculating, for each sample triplet of the second sample triplet set, a fourth distance between the feature vector of the training sample and a feature vector of the negative sample by using the embedding vector network;

calculating a fourth error loss between a difference value of the third distance and the fourth distance and a second distance threshold, the second distance threshold being a threshold of a difference value between a distance from the training sample to the positive sample and a distance from the training sample to the negative sample; and training the embedding vector network on the basis of the $n_2$ fourth error losses.

11. A non-transitory computer-readable storage medium, storing a computer program that, when executed by a processor of a computer device, causes the computer device to implement a method for training a retrieval model, the retrieval model comprising a basic feature network, an embedding vector network and a quantization index network, the method including:

obtaining n sample triplets used for training the retrieval model, each sample triplet comprising a training sample, a positive sample that constitutes a similar sample pair with the training sample, and a negative sample that does not constitute a similar sample pair with the training sample, and n being a positive integer greater than 1;

obtaining basic feature vectors of the n sample triplets by using the basic feature network;

inputting the basic feature vectors of the n sample triplets to the embedding vector network to identify a first sample triplet set according to errors of feature vectors output by the embedding vector network;

inputting the basic feature vectors of the n sample triplets to the quantization index network to identify a second sample triplet set according to errors of quantization indexes output by the quantization index network;

training the quantization index network and the embedding vector network on the basis of the first sample triplet set and the second sample triplet set;

obtaining a basic feature vector of a query object;

inputting the basic feature vector to the quantization index network and the embedding vector network;

obtaining a quantization index of the query object by using the quantization index network, and obtaining a feature vector of the query object by using the embedding vector network;

obtaining feature vectors of m candidate objects from indexes in a quantization codebook on the basis of the quantization index; and identifying, among the m candidate objects, top z candidate objects whose associated feature vectors are within a predefined distance from the feature vector of the query object, z being a positive number.

12. The non-transitory computer-readable storage medium according to claim 11, wherein the inputting basic feature vectors of the n sample triplets to the embedding vector network to identify a first sample triplet set according to errors of feature vectors output by the embedding vector network comprises:

obtaining n groups of triplet feature vectors output by the embedding vector network for the n sample triplets;

calculating n first error losses corresponding to the n groups of triplet feature vectors;

identifying sample triplets corresponding to $n_1$ first error losses falling within a first selection range; and adding the sample triplets to the first sample triplet set used for training the quantization index network, $n_1$ being a positive integer less than n.

13. The non-transitory computer-readable storage medium according to claim 11, wherein the inputting the basic feature vectors of the n sample triplets to the quantization index network to identify a second sample triplet set according to errors of quantization indexes output by the quantization index network comprises:

obtaining n groups of triplet quantization indexes output by the quantization index network for the n sample triplets;

calculating n second error losses corresponding to the n groups of triplet quantization indexes;

identifying sample triplets corresponding to $n_2$ second error losses falling within a second selection range; and adding the sample triplets to the second sample triplet set used for training the embedding vector network, $n_2$ being a positive integer less than n.

14. The non-transitory computer-readable storage medium according to claim 11, wherein the training the quantization index network on the basis of the first sample triplet set comprises:
- calculating, for each sample triplet of the first sample triplet set, a second triplet loss of the triplet feature vector by using the quantization index network, the triplet feature vector being a feature vector output by the embedding vector network, and the first sample triplet set comprising $n_1$ sample triplets;
- calculating, for each sample triplet of the first sample triplet set, a second quantization error loss of the triplet feature vector by using the quantization index network;
- performing weighted summation on the second triplet loss and the second quantization error loss to obtain a third error loss; and
- training the quantization index network on the basis of the $n_1$ third error losses.

15. The non-transitory computer-readable storage medium according to claim 11, wherein the training the embedding vector network on the basis of the second sample triplet set comprises:
- calculating, for each sample triplet of the second sample triplet set, a third distance between a feature vector of the training sample and a feature vector of the positive sample by using the embedding vector network, the second sample triplet set comprising $n_2$ sample triplets;
- calculating, for each sample triplet of the second sample triplet set, a fourth distance between the feature vector of the training sample and a feature vector of the negative sample by using the embedding vector network;
- calculating a fourth error loss between a difference value of the third distance and the fourth distance and a second distance threshold, the second distance threshold being a threshold of a difference value between a distance from the training sample to the positive sample and a distance from the training sample to the negative sample; and
- training the embedding vector network on the basis of the $n_2$ fourth error losses.

* * * * *